(12) United States Patent
Kuroki et al.

(10) Patent No.: US 12,081,564 B2
(45) Date of Patent: Sep. 3, 2024

(54) ESTIMATION SYSTEM, ESTIMATION METHOD, AND ESTIMATION PROGRAM

(71) Applicant: NIPPON TELEGRAPH AND TELEPHONE CORPORATION, Tokyo (JP)

(72) Inventors: Kotomi Kuroki, Musashino (JP); Yo Kanemoto, Musashino (JP); Kazufumi Aoki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 169 days.

(21) Appl. No.: 17/793,657

(22) PCT Filed: Oct. 26, 2020

(86) PCT No.: PCT/JP2020/040152
§ 371 (c)(1),
(2) Date: Jul. 19, 2022

(87) PCT Pub. No.: WO2021/149317
PCT Pub. Date: Jul. 29, 2021

(65) Prior Publication Data
US 2023/0007020 A1      Jan. 5, 2023

(30) Foreign Application Priority Data

Jan. 20, 2020   (WO) .................. PCT/JP2020/001781

(51) Int. Cl.
*H04L 9/40* (2022.01)
*G06F 16/901* (2019.01)
*G06F 16/9538* (2019.01)

(52) U.S. Cl.
CPC ...... *H04L 63/1416* (2013.01); *G06F 16/9027* (2019.01); *G06F 16/9538* (2019.01)

(58) Field of Classification Search
CPC .. G06F 16/9027; G06F 16/9538; G06F 16/95; G06F 21/55; H04L 63/1408; H04L 63/1466
See application file for complete search history.

(56) References Cited

U.S. PATENT DOCUMENTS

| | | | |
|---|---|---|---|
| 2008/0047009 A1* | 2/2008 | Overcash ............ | H04L 63/1408 726/23 |
| 2015/0113646 A1* | 4/2015 | Lee ..................... | H04L 63/1408 726/23 |

(Continued)

FOREIGN PATENT DOCUMENTS

WO   WO-2019013266 A1 *   1/2019   ............. G06F 21/55

OTHER PUBLICATIONS

OWASP Foundation Inc., "OWASP ModSecurity Core Rule Set, the 1st Line of Defense", OWASP ModSecurity Core Rule Set Project, version: 3.2.0, Sep. 24, 2019, 2 pages.

(Continued)

*Primary Examiner* — Anh Nguyen
(74) *Attorney, Agent, or Firm* — XSENSUS LLP

(57) ABSTRACT

An estimation unit retrieves a subtree that matches a query to be estimated, from subtrees included in a syntax tree created from a query inserted into a Web request. In addition, the estimation unit presents information for specifying the type of damage of an attack and an attack target, the information being associated in advance with the subtree obtained by the retrieval of the retrieval unit.

6 Claims, 37 Drawing Sheets

(56) References Cited

U.S. PATENT DOCUMENTS

| | | | |
|---|---|---|---|
| 2015/0205951 A1* | 7/2015 | Anand | G06F 21/52 707/700 |
| 2019/0207974 A1* | 7/2019 | Jas | G06F 16/24565 |
| 2020/0201987 A1 | 6/2020 | Kanemoto | |

OTHER PUBLICATIONS

Kar et al., "SQLiGOT: Detecting SQL Injection Attacks using Graph of Tokens and SVM", Computers & Security, vol. 60, 2016, pp. 206-225.

Sheykhkanloo, "A Learning-based Neural Network Model for the Detection and Classification of SQL Injection Attacks", International Journal of Cyber Warfare and Terrorism (IJCWT), 2017, vol. 7, No. 2, 2017, 12 pages.

Gu et al., "DIAVA: A Traffic-Based Framework for Detection of SQL Injection Attacks and Vulnerability Analysis of Leaked Data", IEEE Transactions on Reliability, Jul. 24, 2019, pp. 1-15.

Kuroki et al., "SQL Injection Damage Estimation Method That Combines Parsing and Emulation (Abstract)", Program SCIS 2020 and Information Security Symposium, Available Online at: https://www.iwsec.org/scis/2020/program.html, Jan. 21, 2020, 5 pages including English Translation.

Kuroki et al., "A Damage Identification Method Based on Syntax Analysis and Semantic Analysis for SQL Injection", Proceedings of the 2020 Symposium on Cryptography and Information Security, the Institute of Electronics Information and Communication Engineers, Jan. 28-31, 2020, pp. 1-8 (17 pages including English Translation).

\* cited by examiner

Fig. 4

```
POST /index.php HTTP/1.1
Host: xx.xx
...

id=1 ;WAITFOR DELAY '0:0:5'--&name=
```

`1 ;WAITFOR DELAY '0:0:5'--`

Fig. 5

| |
|---|
| " union select passwd from users -- |
| 1) AND ORD(MID((IFNULL(CAST(VERSION() AS CHAR),0x20)),1,1))!=53-- |
| 2 AND 7884=CONVERT(INT,(SELECT CHAR(58) CHAR(113) (SELECT (CASE WHEN (7884=7884) THEN CHAR(49) ELSE CHAR(48) END)) CHAR(58) CHAR(122) CHAR(119) CHAR(120) CHAR(58)))-- |
| ' AnD sLeep(3) ANd '0'='0 |

Fig. 6

| ATTACK QUERY | | SUPPLEMENTED ATTACK QUERY |
|---|---|---|
| a' OR 1=1 -- | | 'a' OR 1=1 -- ' |
| a" OR 1=1 -- | ⇒ | "a" OR 1=1 -- " |
| 1) OR 1=1 -- | | (1) OR 1=1 -- |
| 1)) OR 1=((1 | | ((1)) OR 1=((1)) |
| a" )) OR 1=1 -- | | (("a")) OR 1=1 -- " |

Fig. 12

```
<sqli-query> ::= <statements>
<statements> ::= <statement> | [<statement>] ( <SEMICOLON> <statement> )+
<statement> ::= <items> | (<SQL-WORD> [ <items> [<NAME>] ] )+
<items> ::= <condition> ( <COMMA> <condition> )*
<condition> ::= <expression> [ <RELATIONAL-OPERATOR> <expression> ]
<expression> ::= <value> | [<value>] ( <ARITHMETIC-OPEARTOR> <value> )+
<value> ::= <function> | <parenthesis> | <NAME> | <NUMBER> | <STRING> | <ASTERISK>
<function> ::= <NAME> <LEFT-PARENTHESIS> [<statement>] <RIGHT-PARENTHESIS>
<parenthesis> ::= <LEFT-PARENTHESIS> [<statement>] <RIGHT-PARENTHESIS>
```

Fig. 13

| TYPE | DESCRIPTION | EXAMPLE | | | | |
|---|---|---|---|---|---|---|
| SQL-WORD | WORDS INCLUDED IN SYNTAX OF SQL | SELECT | FROM | WHERE | AND | CASE |
| RELATIONAL-OPERATOR | COMPARISON OPERATOR | == | != | <> | <= | |
| ARITHMETIC-OPERATOR | ARITHMETIC OPERATOR | + | - | * | / | |
| STRING | CHARACTER STRING SURROUNDED BY QUOTATION MARKS | "abc" | 'abc' | "a b 1" | | |
| NUMBER | NUMERICAL VALUE | 123 | 0x1A | 1.5 | 4e5 | |
| NAME | VARIABLE NAME, TABLE NAME, AND THE LIKE | abc | CHAR | a1 | a_b_1 | |
| COMMENT | COMMENT IN SQL | -- abc | /* abc */ | | # abc | |
| OTHER SPECIFIC SIGNALS | | | | | | |

Fig. 15

| RULE NUMBER | CONDITION | | | | | | | | CONVERSION METHOD |
|---|---|---|---|---|---|---|---|---|---|
| | Type | PARENT TYPE | NUMBER OF CHILD NODES | (1) | (2) | (3) | (4) | (5) | |
| 1 | statement | sql-query | – | – | – | – | – | – | NOT PERFORM CONVERSION |
| 2 | – | – | – | – | GOOD | POOR | – | POOR | SET EXECUTION RESULT TO BE TOKEN |
| 3 | – | – | – | GOOD | POOR | GOOD | POOR | – | IMPART LABEL REPRESENTING ERROR USING QUERY CHARACTER STRING AS TOKEN |
| 4 | function | – | 3 | GOOD | – | POOR | – | – | IMPART LABEL REPRESENTING ENVIRONMENT-DEPENDENT FUNCTION USING QUERY CHARACTER STRING AS TOKEN |
| 5 | – | – | – | GOOD | POOR | – | – | GOOD | IMPART LABEL REPRESENTING ACCESS TO ENVIRONMENT-DEPENDENT SYSTEM TABLE USING QUERY CHARACTER STRING AS TOKEN |
| 6 | – | – | – | GOOD | POOR | GOOD | GOOD | – | IMPART LABEL REPRESENTING ACCESS TO ENVIRONMENT-DEPENDENT SERVER SPECIFIC TABLE USING QUERY CHARACTER STRING AS TOKEN |

ESTIMATION SYSTEM, ESTIMATION METHOD, AND ESTIMATION PROGRAM

CROSS-REFERENCE TO RELATED APPLICATIONS

The present application is based on PCT filing PCT/JP2020/040152, filed Oct. 26, 2020, which claims priority to PCT/JP2020/001781, filed Jan. 20, 2020, the entire contents of each are incorporated herein by reference.

TECHNICAL FIELD

The present disclosure relates to an estimation system, an estimation method, and an estimation program.

BACKGROUND ART

In the related art, a technique for taking countermeasures for an SQL injection is known. Here, an SQL injection is an attack for causing a Web server to execute a fraudulent SQL query. SQL injections are particularly numerous among attacks on Web servers because of the large number of Web applications that use a Web server including a database and the ease of the attack itself.

For example, as a technique for detecting an SQL injection, a Web application firewall (WAF) that detects or blocks traffic matching a rule, such as a previously prepared regular expression, as an attack is known (see, for example, NPL 1). In addition, a technique for detecting an attack by applying a support vector machine (SVM) to an SQL query executed in a database is known (see, for example, NPL 2).

In addition, a technique for determining whether an attack of an SQL injection has been successful based on emulated results and responses is known (see, for example, PTL 1).

In addition, a technique for classifying and detecting an attack type of an SQL injection using machine learning is known (see, for example, NPL 3). In addition, a technique for classifying an attack type of an SQL injection using a regular expression and extracting a character string leaked from a payload of a response is known (see, for example, NPL 4).

CITATION LIST

Patent Literature

PTL 1: WO 2019/013266

Non Patent Literature

NPL 1: OWASP ModSecurity Core Rule Set:https://coreruleset.org/
NPL 2: D. Kar, S. Panigrahi, and S. Sundararajan, "SQLiGoT:Detecting SQL injection attacks using graph of tokens and SVM," Comput. Secur., vol. 60, pp. 206-225, 2016.
NPL 3: Naghmeh Moradpoor Sheykhkanloo, "A Learning-based Neural Network Model for the Detection and Classification of SQL Injection Attacks," International Journal of Cyber Warfare and Terrorism (IJCWT), 2017.
NPL 4: Haifeng Gu, Jianning Zhang, Tian Liu, Ming Hu, Junlong Zhou, Tongquan Wei and Mingsong Chen, "DIAVA:A Traffic-Based Framework for Detection of SQL Injection Attacks and Vulnerability Analysis of Leaked Data," IEEE Transactions on Reliability, 2019.

SUMMARY OF THE INVENTION

Technical Problem

However, the related art has a problem in that it may be difficult to specify an attack target of an SQL injection. The details of countermeasures when it is unclear which database (DB) or system has become an attack target even though an SQL injection has been detected are not considered to have been efficiently examined.

For example, in a WAF and an SVM disclosed in NPL 1 and NPL 2, even when an attack has been detected, an attack method and an attack target may not be able to be specified. In addition, the technique disclosed in PTL 1 is a technique for determining whether an attack has been successful. Further, the techniques disclosed in NPL 3 and NPL 4 are techniques for specifying an attack type. Thus, in the related art, it is difficult to specify an attack target of an SQL injection.

Means for Solving the Problem

In order to solve the above-described problems and achieve an object, an estimation system includes a retrieval unit configured to retrieve a subtree that matches a query to be estimated, from subtrees included in a syntax tree created from a query inserted into a Web request, and a presentation unit configured to present information for specifying the type of damage of an attack and an attack target, the information being associated in advance with the subtree obtained by the retrieval unit in the retrieval.

Effects of the Invention

According to the present disclosure, it is possible to specify an attack target of an SQL injection.

BRIEF DESCRIPTION OF DRAWINGS

FIG. 4 is a diagram illustrating an example of an attack query.
FIG. 5 is a diagram illustrating an example of another attack query.
FIG. 6 is a diagram illustrating an example of attack queries in which quotation marks and parentheses are supplemented.
FIG. 12 is a diagram illustrating an example of a type node.
FIG. 13 is a diagram illustrating an example of a token node.

FIG. 15 is a diagram illustrating an example of a semantic analysis rule.

DESCRIPTION OF EMBODIMENTS

Hereinafter, embodiments of an estimation system, an estimation method, and an estimation program according to the present application will be described in detail based on the drawings. Note that the present disclosure is not limited to the embodiments described below.

First Embodiment

Configuration of First Embodiment

Figure 1:
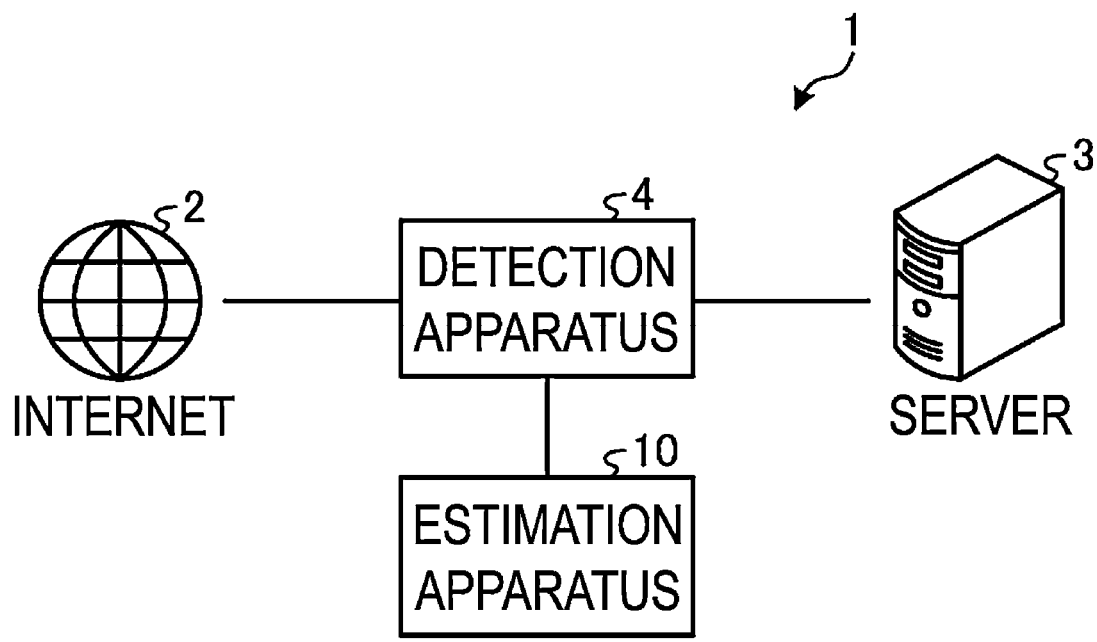
FIG. 1 is a diagram illustrating a configuration example of an estimation system according to a first embodiment.

First, a configuration of an estimation system according to a first embodiment will be described using FIG. 1. FIG. 1 is a diagram illustrating a configuration example of the estimation system according to the first embodiment. As illustrated in FIG. 1, an estimation system 1 includes a server 3, a detection apparatus 4, and an estimation apparatus 10. In addition, the server 3 is connected to the Internet 2 via the detection apparatus 4.

The server 3 is a Web server for executing a Web application. The server 3 executes a database or a Web application using a database. The server 3 receives a Web request via the Internet 2, executes processing in accordance with the Web request, and returns a response. Here, the server 3 can construct an SQL query based on a predetermined query included in the Web request and execute the SQL query on the database.

The detection apparatus 4 detects a Web request that has been sent via the Internet 2, the Web request being intended for an attack on the server 3. For example, the detection apparatus 4 functions as a WAF and can perform detection using the technique disclosed in NPL 1.

The estimation apparatus 10 performs estimation related to damage that occurs when the server 3 executes processing in response to the Web request, based on the Web request detected by the detection apparatus 4. In particular, the estimation apparatus 10 can estimate the content of damage that occurs due to an SQL injection.

Figure 2:
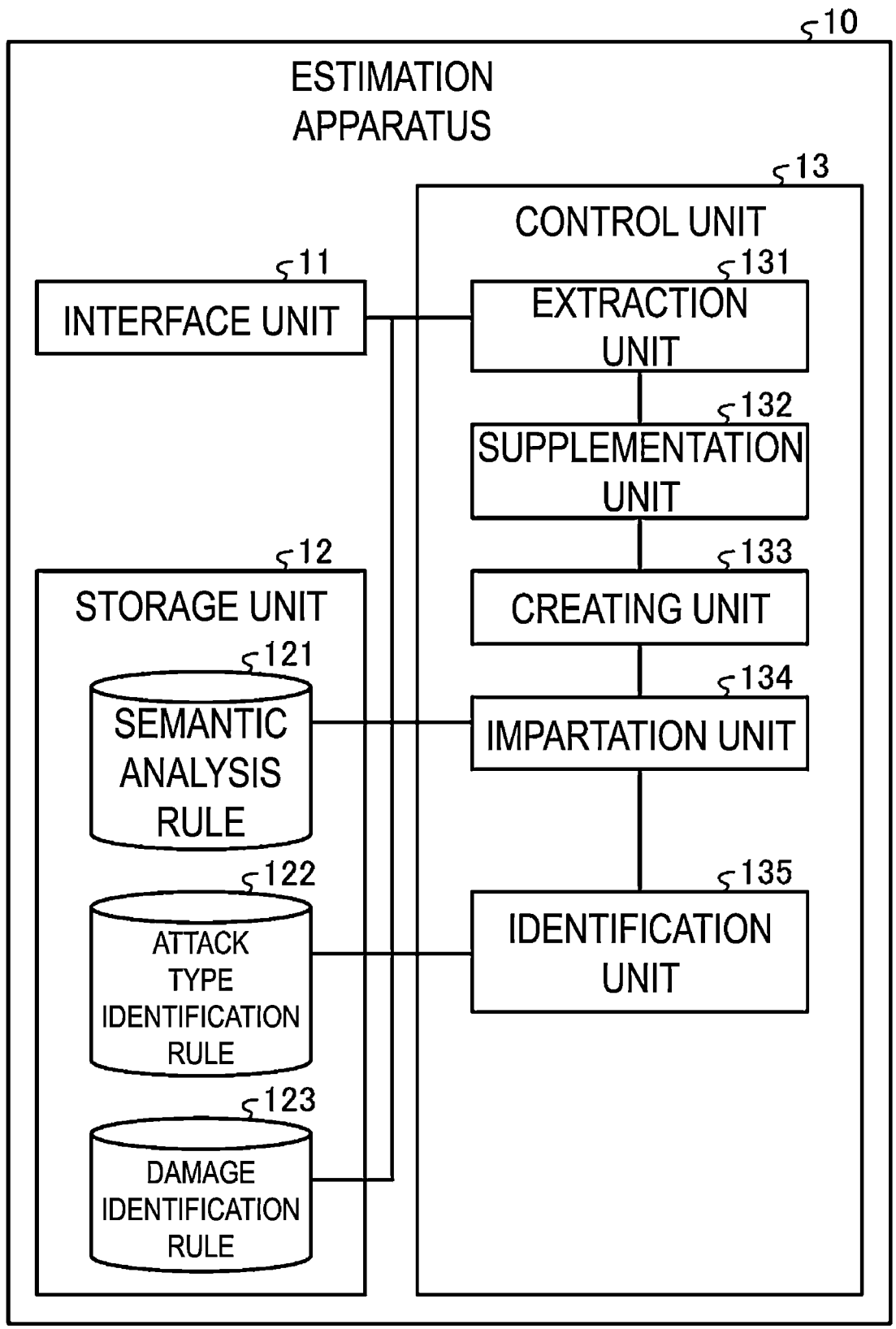
FIG. 2 is a diagram illustrating a configuration example of an estimation apparatus according to the first embodiment.

A configuration of the estimation apparatus 10 will be described using FIG. 2. FIG. 2 is a diagram illustrating a configuration example of the estimation apparatus. As illustrated in FIG. 2, the estimation apparatus 10 includes an interface unit 11, a storage unit 12, and a control unit 13.

The interface unit 11 is an interface for inputting and outputting data and performing communication of data. For example, the interface unit 11 receives an input of data from an input device such as a keyboard or a mouse. In addition, for example, the interface unit 11 may output data to an output device such as a display or a speaker. In addition, for example, the interface unit 11 may be a network interface card (NIC).

The storage unit 12 is a storage device such as a Hard Disk Drive (HDD), a Solid State Drive (SSD), or an optical disc. Note that the storage unit 12 may be a semiconductor memory capable of rewriting data, such as a Random Access Memory (RAM) or a flash memory, and a Non Volatile Static Random Access Memory (NVSRAM). The storage unit 12 stores an operating system (OS) or various programs that are executed in the estimation apparatus 10. The storage unit 12 stores a semantic analysis rule 121, an attack type identification rule 122, and a damage identification rule 123.

The semantic analysis rule 121 is a rule for performing semantic analysis of an attack query. The attack type identification rule 122 is a rule for identifying the type of attack according to an attack query. The damage identification rule 123 is a rule for identifying damage occurring in association with an attack according to an attack query.

The control unit 13 controls the entire estimation apparatus 10. The control unit 13 may be an electronic circuit such as a Central Processing Unit (CPU) or a Micro Processing Unit (MPU), or an integrated circuit such as an Application Specific Integrated Circuit (ASIC) or a Field Programmable Gate Array (FPGA). In addition, the control unit 13 includes an internal memory for storing programs defining various processing procedures and control data, and executes each of the processing operations using the internal memory. Further, the control unit 13 functions as various processing units by operating various programs. For example, the control unit 13 includes an extraction unit 131, a supplementation unit 132, a creating unit 133, an impartation unit 134, and an identification unit 135.

The extraction unit 131 extracts an attack query from a Web request that is detected to be an attack. Here, the attack query is a query that has been inserted into a Web request that is detected to be an attack. For example, an SQL query generated based on an attack query may actually execute an attack. The attack query may also be called "a query suspected to be used for an attack."

Figure 3:
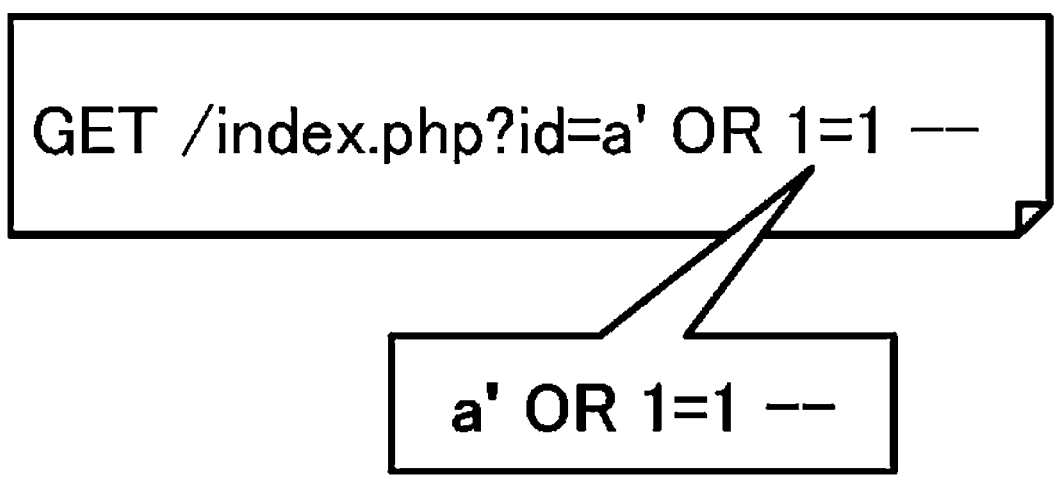
FIG. 3 is a diagram illustrating an example of an attack query.

FIGS. 3 and 4 are diagrams illustrating an example of an attack query. A Web request of a GET method in FIG. 3 and a Web request of a POST method in FIG. 4 are Web requests detected by the detection apparatus 4. For example, as illustrated in FIGS. 3 and 4, the extraction unit 131 may extract the value of a variable in an attack query of a Web request. That is, the extraction unit 131 extracts a character string after "id=" that is shown after "?" of the Web request illustrated in FIG. 3 as an attack query. In addition, the extraction unit 131 extracts a character string after "id=" that is shown after "?" and before "&" of the Web request illustrated in FIG. 4 as an attack query.

In the example of FIG. 3, the extraction unit 131 extracts "a' OR 1=1—" as an attack query. Further, in the example of FIG. 4, the extraction unit 131 extracts "1; WAITFOR DELAY '0:0:5'—" as an attack query. In addition, the extraction unit 131 extracts an attack query as illustrated in FIG. 5. In addition, the extraction unit 131 may extract an attack query using an existing regular expression or the like.

The supplementation unit 132 adds quotation marks and parentheses that are missing from an attack query to facilitate syntax analysis of the attack query. FIG. 6 is a diagram illustrating an example of an attack query in which quotation marks and parentheses are supplemented. As illustrated in FIG. 6, the supplementation unit 132 can supplement various quotation marks, parentheses, and the like. Note that the quotation marks include a single quote "'," a double quote """, a back quote "`," and the like.

Figure 7:
FIG. 7 is a diagram illustrating an example of a quotation mark supplementation method.

FIG. 7 is a diagram illustrating an example of a quotation mark supplementation method. As illustrated in FIG. 7, in a case where quotation marks are included in an attack query, the supplementation unit 132 adds the same quotation marks included in the attack query before and after the attack query. On the other hand, in a case where quotation marks are not included in an attack query, the supplementation unit 132 does not supplement quotation marks.

Figure 8:
FIG. 8 is a diagram illustrating an example of a parenthesis supplementation method.

FIG. 8 is a diagram illustrating an example of a parenthesis supplementation method. As illustrated in FIG. 8, in a case where no corresponding opposite parenthesis is present in an attack query among parentheses included in the attack query, the supplementation unit 132 adds the corresponding parenthesis before and after the attack query. On the other hand, in a case where the corresponding parenthesis is present in the attack query, the supplementation unit 132 regards a portion surrounded by the parentheses as complete and does not supplement a parenthesis.

Figure 9:
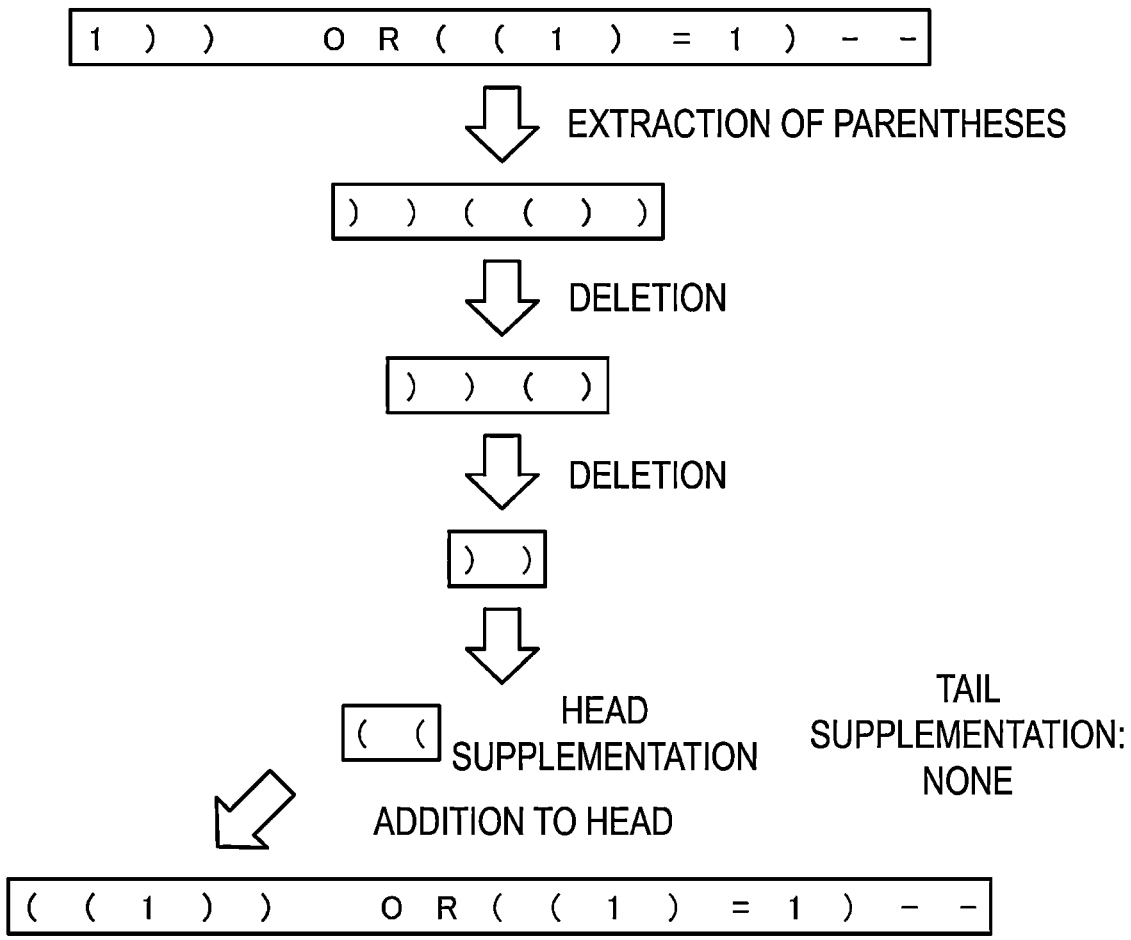
FIG. 9 is a diagram showing details of a parenthesis supplementation method.

FIG. 9 is a diagram showing details of a parenthesis supplementation method. As illustrated in FIG. 9, first, the supplementation unit 132 extracts only parentheses from an attack query. Then, the supplementation unit 132 deletes complete parentheses from the extracted parentheses. Here, in the example of FIG. 9, two closing parentheses "))" remain as parentheses having no corresponding parentheses, and thus the supplementation unit 132 adds two opening parentheses "((" at the head of the attack query.

The creating unit 133 creates a syntax tree in accordance with a rule defined in advance from the attack query extracted by the extraction unit 131. For example, the creating unit 133 may create a syntax tree having a first node representing the type of text included in the attack query extracted by the extraction unit 131 and a second node representing a character string included in the text. In this manner, the creating unit 133 performs syntax analysis of the attack query to generate a syntax tree.

In the present embodiment, the first node and the second node are referred to as a type node and a token node, respectively. The type node represents the type of text included in the attack query. In addition, the token node represents a character string included in the text.

Figure 10:
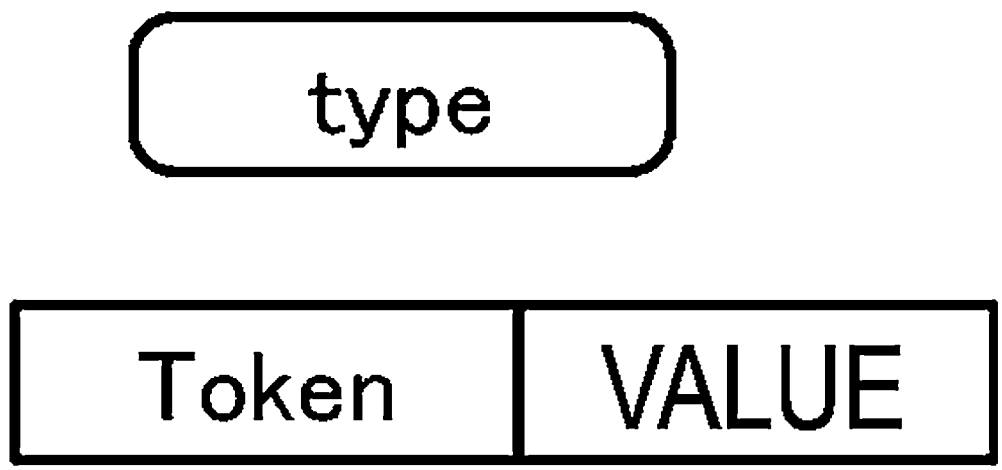
FIG. 10 is a diagram illustrating a legend of a node.

FIG. 10 is a diagram illustrating a legend of a node. In the following description, a type node is represented by a rounded corner square. In addition, a token node is represented by a quadrangle divided into two regions by a partition. The type of token is described in a left region of the token node. In addition, the value of a token is described in a right region of the token node.

Figure 11:
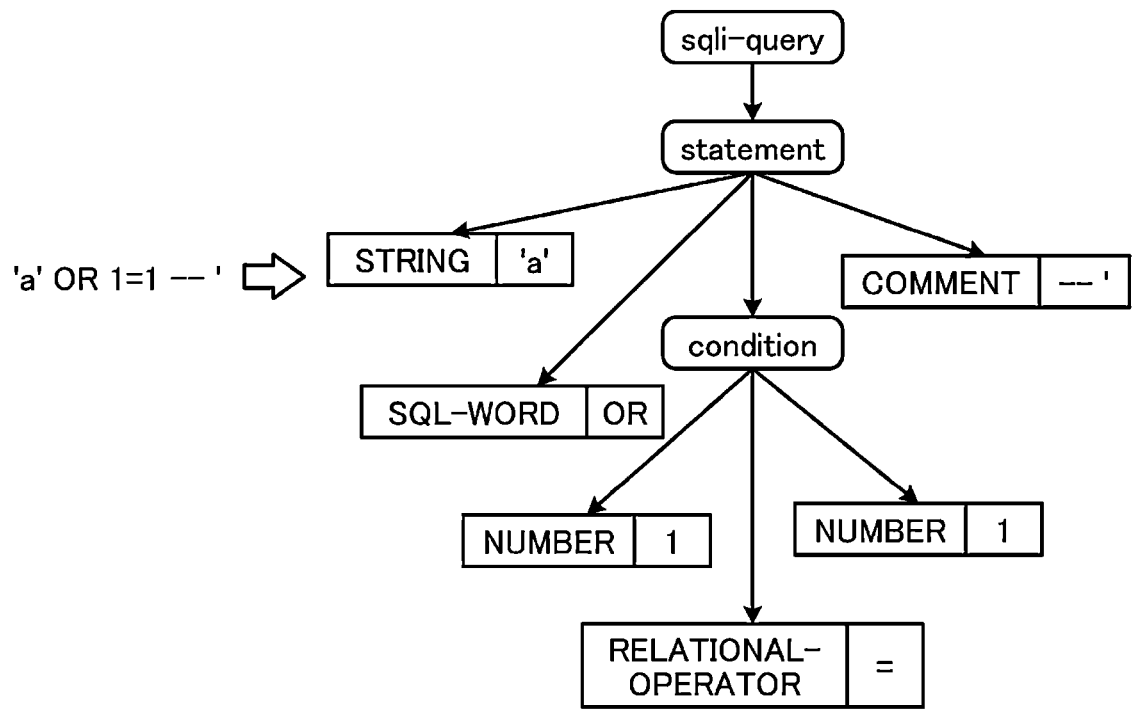
FIG. 11 is a diagram illustrating an example of a syntax tree.

FIG. 11 is a diagram illustrating an example of a syntax tree. The syntax tree illustrated in FIG. 11 is created by the creating unit 133 from an attack query "'a' OR 1=1—'" that has been supplemented by the supplementation unit 132. The "sqli-query," "statement," and "condition" in FIG. 11 are examples of the type of text included in the attack query. In addition, "STRING," "SQL-WORD," "NUMBER," and the like in FIG. 11 are examples of the type of token. Further, "'a'," "OR," "1," and the like in FIG. 11 are examples of the value of the token.

For example, the creating unit 133 creates a syntax tree having a character string that is classified as at least any one type of a word, an operator, a character string surrounded by quotation marks, a numerical value, a variable name, and a comment, which are included in a syntax of SQL, as a second node and having a combination of types of second nodes matching a predefined grammar as a first node.

FIG. 12 is a diagram illustrating an example of a type node. FIG. 12 illustrates a grammar for creating a syntax tree. The creating unit 133 creates a type node according to the grammar illustrated in FIG. 12. For example, the creating unit 133 may create a subtree having a type node <statement> as a root from a portion matching a grammar of "<items>|(<SQL-WORD>[<items>[<NAME>]])+" in an attack query. Then, the creating unit 133 creates a token node located below the type node <statement> from character strings corresponding to <SQL-WORD> and <NAME>. Note that "SQL-WORD" and "NAME" are types of tokens. Note that it is assumed that a subtree also includes a single node.

FIG. 13 is a diagram illustrating an example of a token node. As illustrated in FIG. 13, <SQL-WORD> is a word included in the syntax of SQL, and is, for example, "SELECT," "FROM," and the like. Further, <NAME> is a variable name, a table name, or the like, and is any character string such as "abc" or "a1." Note that, in the following description, the token node may be written as <type:value>. For example, the token node is written as <SQL-WORD: SELECT>, <NAME:abc>, or <STRING:'abc'>.

The impartation unit 134 imparts a label to a subtree having a first node as a root based on results obtained in a case where a partial query corresponding to the subtree is executed. The impartation unit 134 imparts a label to a subtree which is a part of a syntax tree based on results obtained in a case where a partial query corresponding to the subtree has been executed. In this manner, the impartation unit 134 performs semantic analysis of an attack query and imparts a label.

Figure 14:
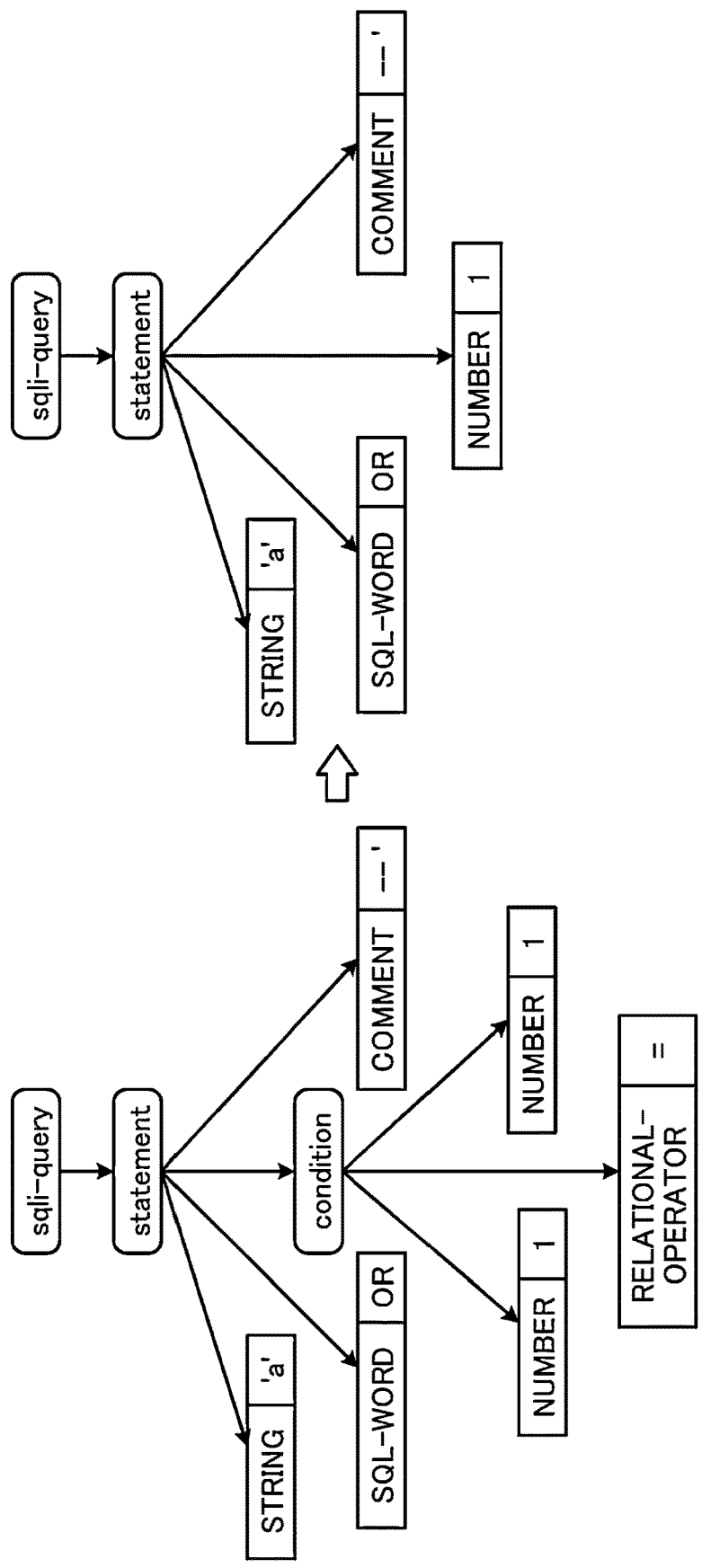
FIG. 14 is a diagram illustrating an example of a syntax tree transformation method.

Further, the impartation unit 134 may perform transformation of a syntax tree before imparting a label. FIG. 14 is a diagram illustrating an example of a syntax tree transformation method. As illustrated in FIG. 14, the impartation unit 134 performs transformation based on results of emulation for each subtree.

First, the impartation unit 134 couples a token included in a subtree having a type node close to a terminus as a root. In the example of FIG. 14, the impartation unit 134 couples the values "1," "=," and "1" of a token node included in a subtree having a type node <condition> as a root. Further, the impartation unit 134 adds "SELECT" to the head of a character string obtained by the coupling, and adds ";" to the tail.

At this time, the impartation unit 134 obtains an SQL query of "SELECT 1=1." The SQL query "SELECT 1=1" obtained here is an example of a partial query. That is, the partial query is a part of an SQL query constituted by the entire syntax tree. When "SELECT 1=1;" is executed on an emulator, "1" is obtained, and thus the impartation unit 134 converts a subtree having a type node <condition> as a root into a token node <NUMBER:1> as illustrated in FIG. 14. In this manner, the impartation unit 134 can simplify the syntax tree.

The impartation unit 134 performs conversion of each subtree and impartation of a label in accordance with the semantic analysis rule 121. FIG. 15 is a diagram illustrating an example of a semantic analysis rule. Conditions (1) to (5) are as follows.

(1) All child nodes of a root are token nodes.
(2) An environment-dependent label is present in a subtree.
(3) An emulation result is an error.
(4) An emulation result is an error having no table or the like.
(5) An emulation result refers to an existing table.

(1) and (2) can be conditions related to a tree structure. In addition, (3) to (5) can be information regarding emulation results. In addition, "GOOD" in FIG. 15 means that a condition is satisfied. In addition, "-" in FIG. 15 means that a condition is not determined. In addition, "POOR" in FIG. 15 means that the condition is not satisfied.

In a case where a root of a subtree is a type node <statement> and a parent node of the root is a type node <sqli-query>, the impartation unit 134 determines that rule 1 is satisfied. In this case, the impartation unit 134 does not perform conversion and impartation of a label.

Figure 16:
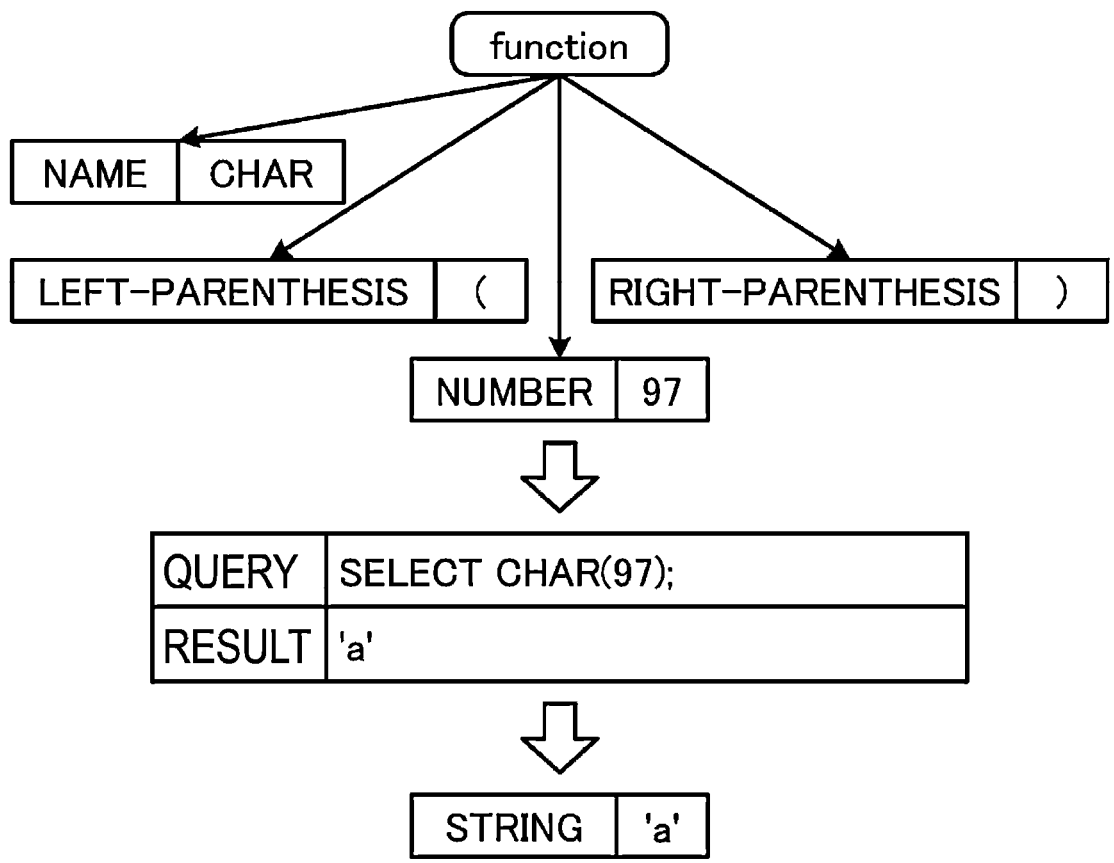
FIG. 16 is a diagram illustrating an example of a subtree that satisfies rule 2.

FIG. 16 is a diagram illustrating an example of a subtree that satisfies rule 2. In a case where condition (1) is satisfied and conditions (2), (3), and (5) are not satisfied, the impartation unit 134 determines that rule 2 is satisfied. In other words, in a case where all child nodes of the root are token nodes (condition (1), GOOD), an environment-dependent label is not present in the subtree (condition (2), POOR), an emulation result is not an error (condition (3), POOR), and an emulation result does not refer to an existing table (condition (5), POOR), the impartation unit 134 determines that rule 2 is satisfied. In this case, the impartation unit 134 converts a subtree into an execution result. In the example of FIG. 16, the impartation unit 134 converts a subtree having a type node <function> as a root into a token node <STRING:'a'>.

Figure 17:
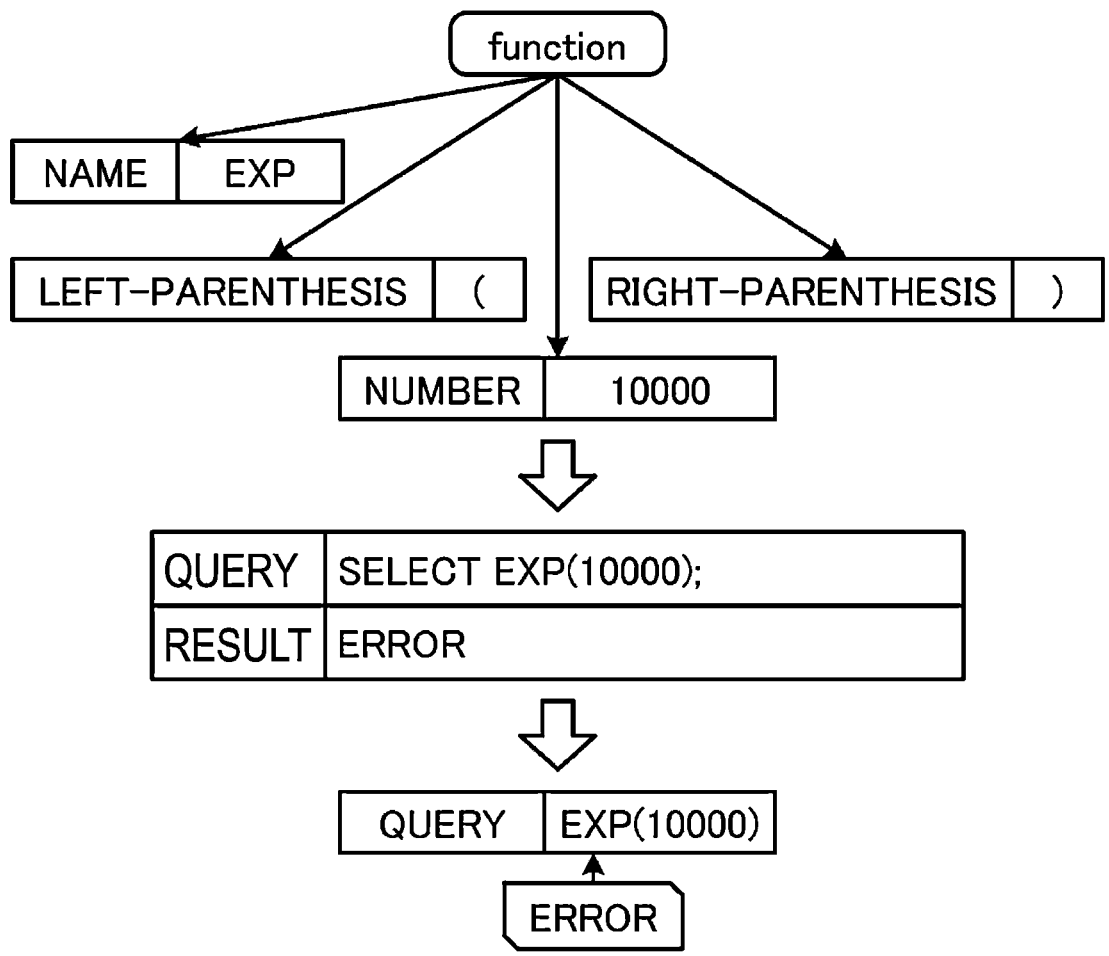
FIG. 17 is a diagram illustrating an example of a subtree that satisfies rule 3.

FIG. 17 is a diagram illustrating an example of a subtree that satisfies rule 3. In a case where conditions (1) and (3) are satisfied and conditions (2) and (4) are not satisfied, the impartation unit 134 determines that rule 3 is satisfied. That is, in a case where all child nodes of the root are token nodes (condition (1), GOOD), an environment-dependent label is not present in the subtree (condition (2), POOR), an emulation result is an error (condition (3), GOOD), and an emulation result is not an error there being no table or the like (condition (4), POOR), the impartation unit 134 determines that rule 3 is satisfied. In this case, the impartation unit 134 sets a character string of a partial query as a token node, and imparts a label representing an error. In the example of FIG. 17, the impartation unit 134 converts a subtree having a type node <function> as a root into a token node <QUERY:EXP (10000)> and imparts a label "ERROR."

Figure 18:
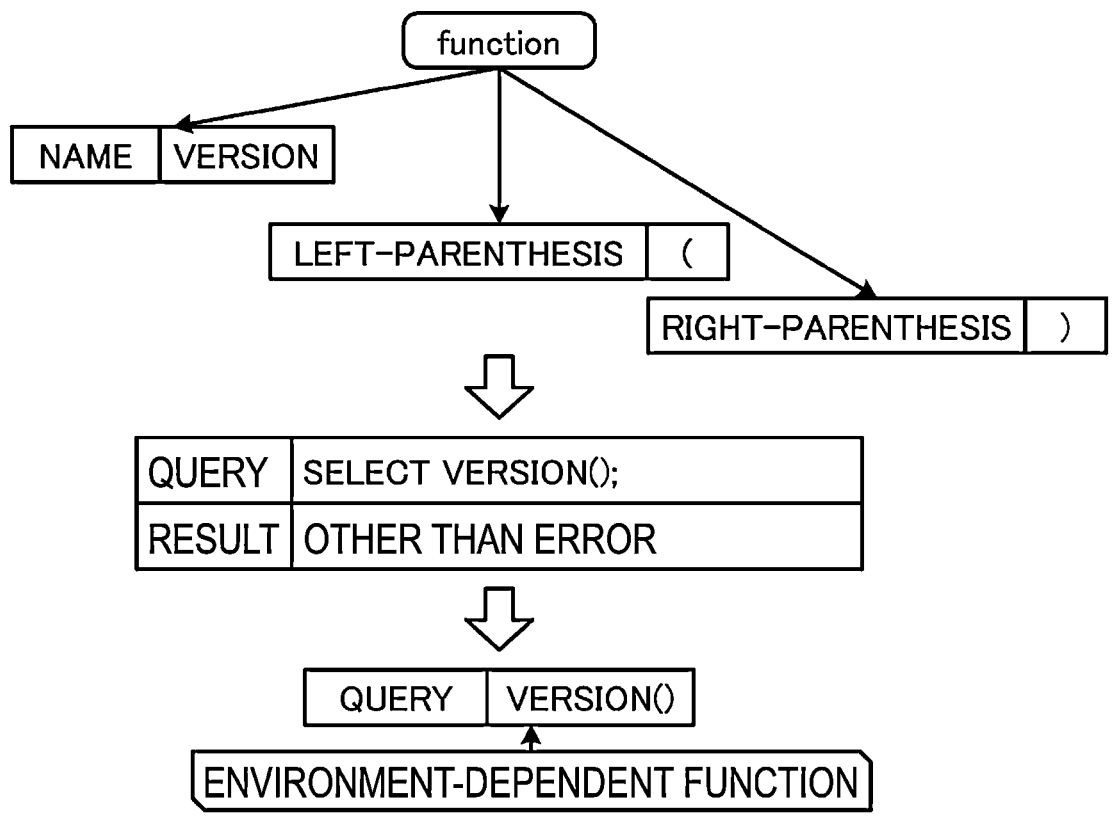
FIG. 18 is a diagram illustrating an example of a subtree that satisfies rule 4.

FIG. 18 is a diagram illustrating an example of a subtree that satisfies rule 4. In a case where the root of the subtree is a type node <function>, the number of child nodes is three, condition (1) is satisfied, and condition (3) is not satisfied, the impartation unit 134 determines that rule 4 is satisfied. That is, in a case where the root of the subtree is a type node <function>, the number of child nodes is three, and all child nodes of the root are token nodes (condition (1), GOOD), and an emulation result is not an error (condition (3), POOR), the impartation unit 134 determines that rule 4 is satisfied. In this case, the impartation unit 134 sets a character string of a partial query as a token node, and imparts a label representing an environment-dependent function. In the example of FIG. 18, the impartation unit 134 converts a subtree having a type node <function> as a root into a token node <QUERY:VERSION ( )> and imparts a label "environment-dependent function."

Figure 19:
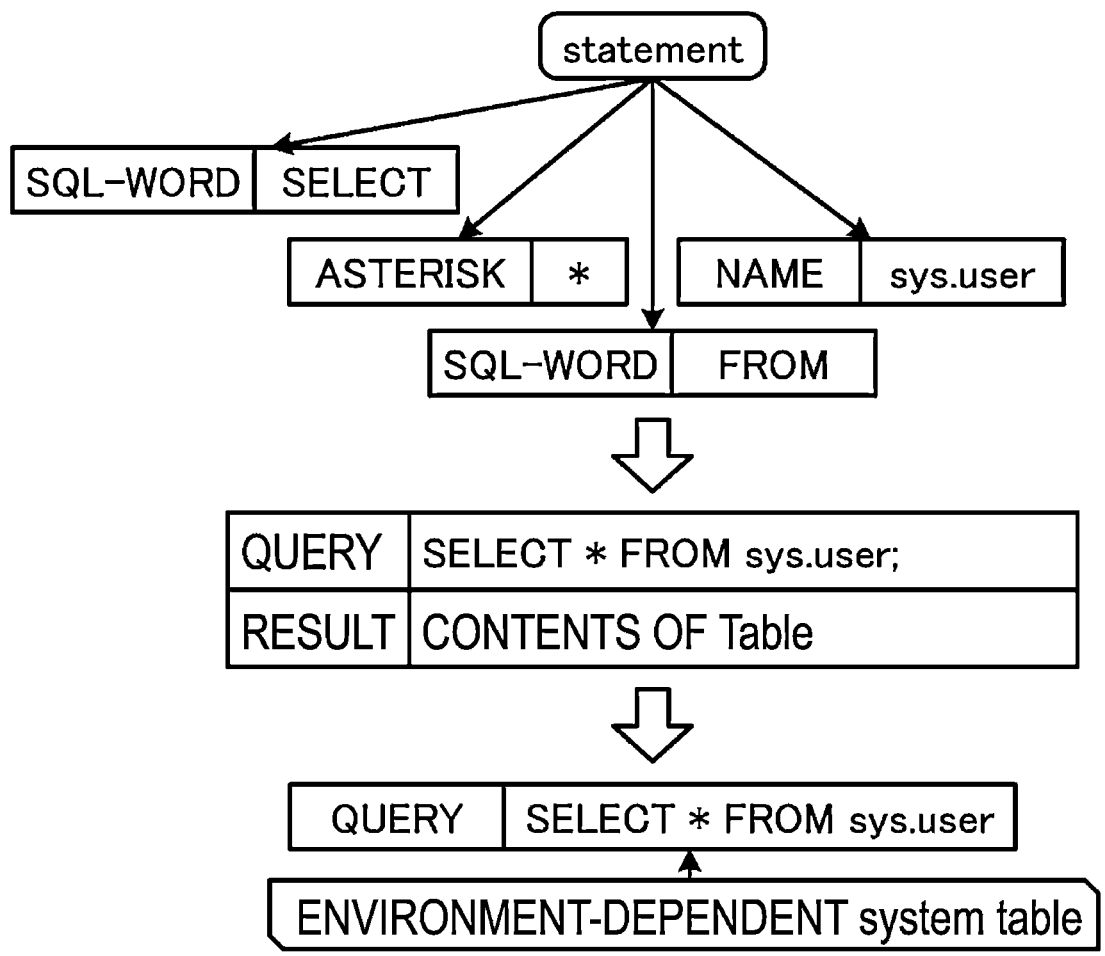
FIG. 19 is a diagram illustrating an example of a subtree that satisfies rule 5.

FIG. 19 is a diagram illustrating an example of a subtree that satisfies rule 5. In a case where conditions (1) and (5) are satisfied and condition (2) is not satisfied, the impartation unit 134 determines that rule 5 is satisfied. That is, in a case where all child nodes of a root are token nodes (condition (1), GOOD), an environment-dependent label is not present in the subtree (condition (2), POOR), and an emulation result refers to an existing table (condition (6), POOR), the impartation unit 134 determines that the rule 5 is satisfied. In this case, the impartation unit 134 sets a character string of a partial query as a token node and imparts a label representing access to an environment-dependent system table. In the example of FIG. 19, the impartation unit 134 converts a subtree having a type node <statement> as a root into a token node <QUERY:SELECT*FROM sys.user> and imparts a label "environment-dependent system table."

Figure 20:
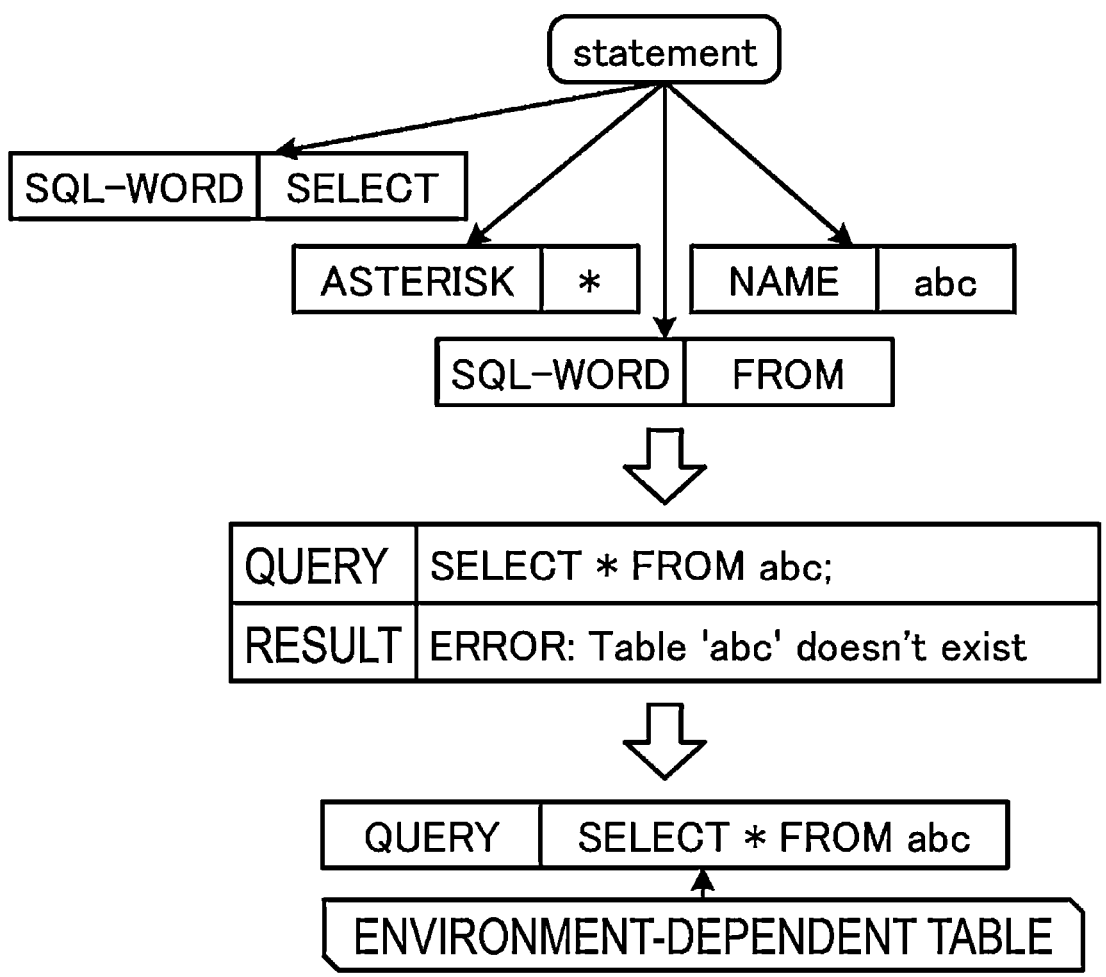
FIG. 20 is a diagram illustrating an example of a subtree that satisfies rule 6.

FIG. 20 is a diagram illustrating an example of a subtree that satisfies rule 6. In a case where conditions (1), (3), and (4) are satisfied and condition (2) is not satisfied, the impartation unit 134 determines that rule 5 is satisfied. That is, in a case where all child nodes of a root are token nodes (condition (1), GOOD), an environment-dependent label is not present in a subtree (condition (2), POOR), an emulation result is a normal error (condition (3), GOOD) and the error is an error of there being no table or the like (condition (4), GOOD), the impartation unit 134 determines that rule 6 is satisfied. In this case, the impartation unit 134 sets a character string of a partial query as a token node and imparts a label representing access to a server-specific table. In the example of FIG. 20, the impartation unit 134 converts a subtree having a type node <statement> as a root into a token node <QUERY:SELECT*FROM abc> and imparts a label "environment-dependent table."

In this manner, the impartation unit 134 can impart any one of a label representing an error, a label representing an environment-dependent function, a label representing access to an environment-dependent system table, and a label representing access to an environment-dependent server specific table to a subtree.

The identification unit 135 identifies the type of damage of an attack according to a Web request based on the label imparted by the impartation unit 134. The identification unit 135 identifies the type of attack according to a Web request based on a label imparted by the impartation unit 134.

In a case where at least a portion of a syntax tree matches a tree structure associated in advance with the type of attack, the identification unit 135 identifies the type of attack as the type of attack according to a Web request and identifies the type of damage of an attack according to the Web request based on a label imparted to a subtree located at a position designated in advance in the tree structure.

Figure 21:
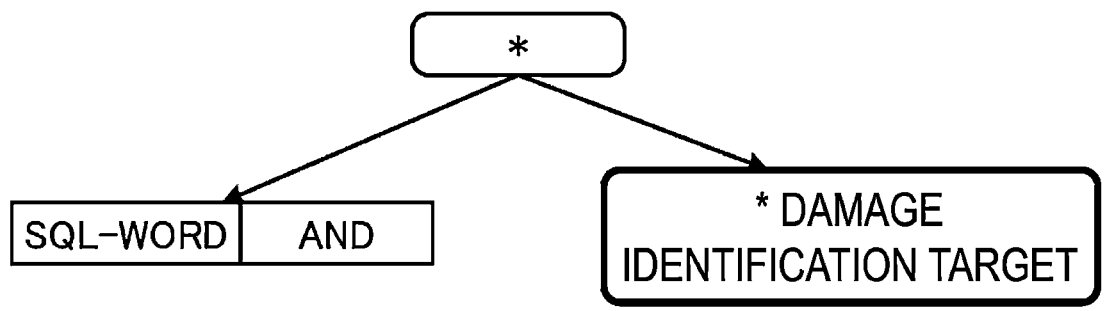
FIG. 21 is a diagram illustrating an example of a subtree in which an attack type is Boolean-based blind.
Figure 22:
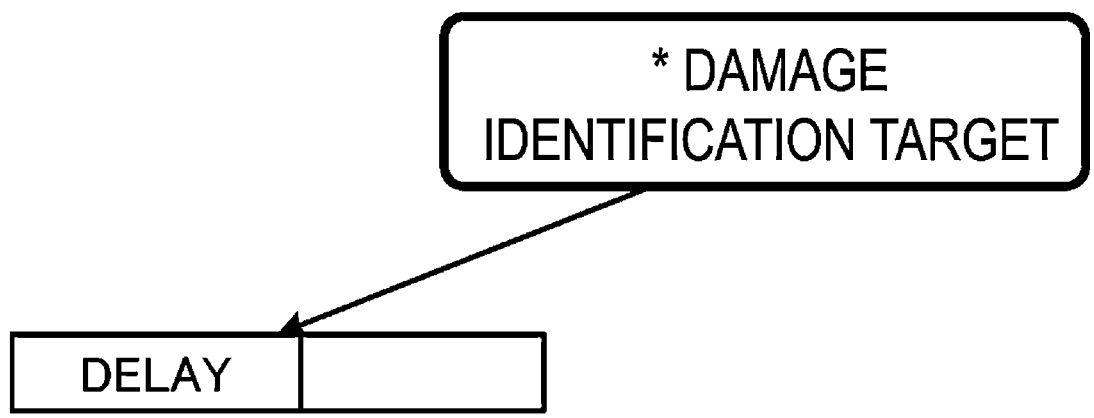
FIG. 22 is a diagram illustrating an example of a subtree in which an attack type is Time-based blind.
Figure 23:
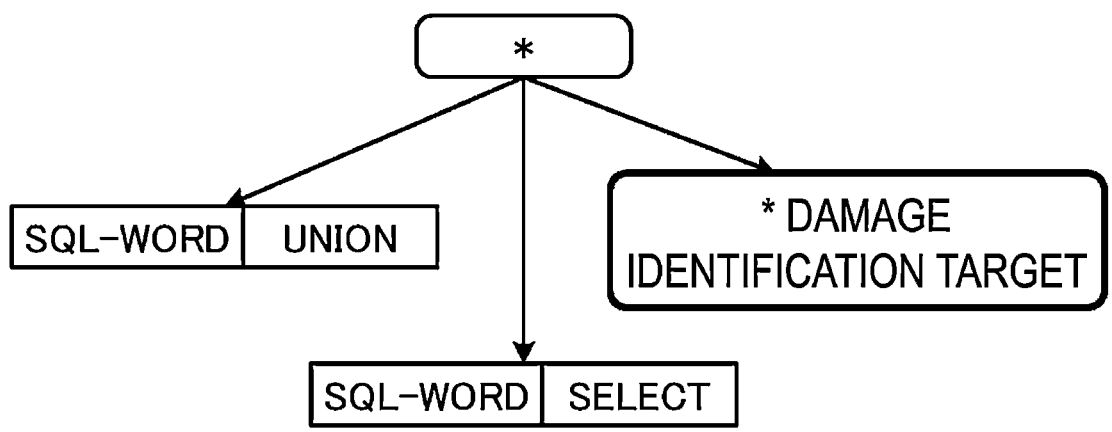
FIG. 23 is a diagram illustrating an example of a subtree in which an attack type is Union-based.
Figure 24:
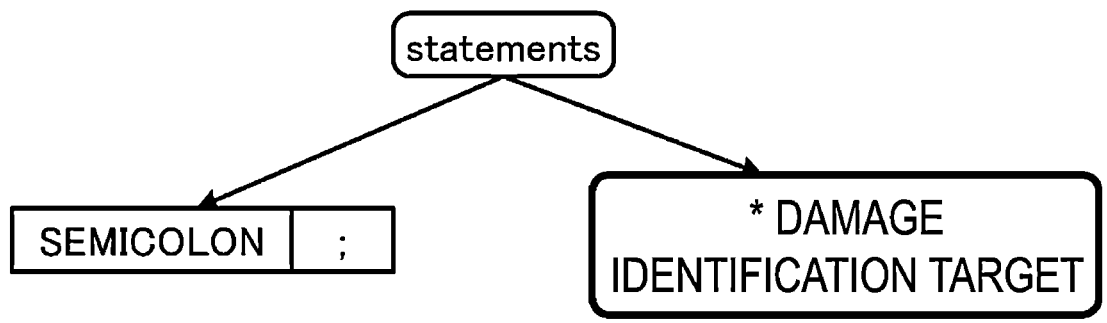
FIG. 24 is a diagram illustrating an example of a subtree in which an attack type is Stacked queries.

FIG. 21 is a diagram illustrating an example of a subtree in which an attack type is Boolean-based blind. FIG. 22 is a diagram illustrating an example of a subtree in which an attack type is Time-based blind. FIG. 23 is a diagram illustrating an example of a subtree in which an attack type is Union-based. FIG. 24 is a diagram illustrating an example of a subtree in which an attack type is Stacked queries. In addition, the identification unit 135 identifies the type of damage due to an attack based on a node or a subtree located at a position described as a "damage identification target" in FIGS. 21 to 24. Such a node or subtree is referred to as a damage identification target subtree. In addition, it is assumed that the rules related to the types of attacks as illustrated in FIGS. 21 to 24 are stored in the storage unit 12 as the attack type identification rule 122.

Figure 25:
FIG. 25 is a diagram illustrating an example of a rule for identifying investigation of vulnerability.

FIG. 25 is a diagram illustrating an example of a rule for identifying investigation of vulnerability. In a case where an environment-dependent label is not imparted to a damage identification target subtree, the identification unit 135 identifies damage of an attack according to an attack query including the damage identification target subtree as investigation of vulnerability. Such an attack is characterized in that an output does not include information such as a specific character string that is dependent on an environment.

Figure 26:
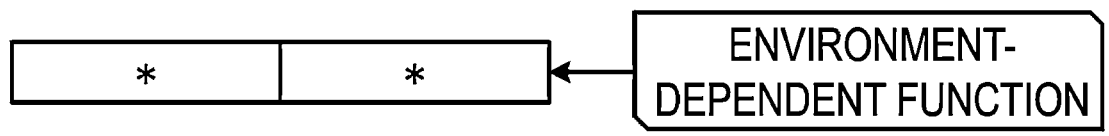
FIG. 26 is a diagram illustrating an example of a rule for identifying leakage of system information.
Figure 27:
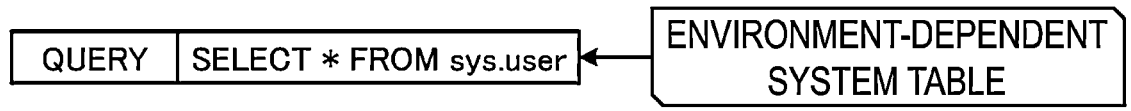
FIG. 27 is a diagram illustrating an example of a rule for identifying leakage of system information.

FIGS. 26 and 27 are diagrams illustrating an example of a rule for identifying leakage of system information. In a case where a label "environment-dependent function" or a label "environment-dependent system table" is imparted to a damage identification target subtree, the identification unit 135 identifies damage of an attack according to an attack query including the damage identification target subtree as leakage of system information. Such an attack is characterized in that a function for outputting access to a table for a system which is present by default and system information is executed.

Figure 28:
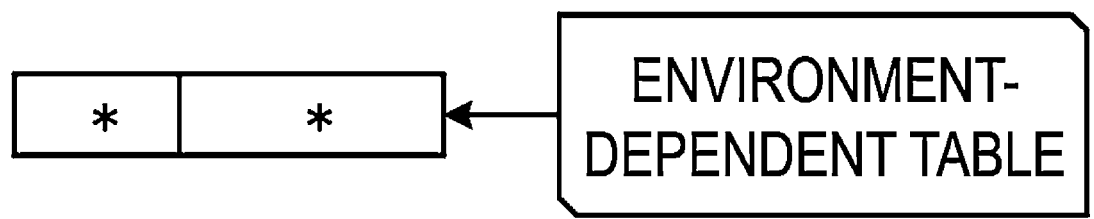
FIG. 28 is a diagram illustrating an example of a rule for identifying leakage of table content.

FIG. 28 is a diagram illustrating an example of a rule for identifying leakage of table content. In a case where a label "environment-dependent table" is imparted to a damage identification target subtree, the identification unit 135 identifies damage of an attack according to an attack query including the damage identification target subtree as leakage of table content. Such an attack is characterized in that content of a server-specific table is leaked.

Figure 29:
FIG. 29 is a diagram illustrating an example of a rule for identifying falsification.

FIG. 29 is a diagram illustrating an example of a rule for identifying falsification. In a case where a damage identification target subtree is a token node <SQL-WORD:DROP>, the identification unit 135 identifies damage of an attack according to an attack query including the damage identification target subtree as falsification. Such an attack is characterized in that content of a database is rewritten.

In this manner, in a case where a label is not imparted to a subtree, the identification unit 135 identifies the type of damage as investigation of vulnerability. In a case where a label representing an environment-dependent function or a label representing access to an environment-dependent system table is imparted to a subtree, the identification unit 135 identifies the type of damage as leakage of system information. In a case where a label representing access to an environment-dependent server specific table is imparted to a subtree, the identification unit 135 identifies the type of damage as leakage of table content. In addition, it is assumed that the rules for identifying damage as illustrated in FIGS. 25 to 29 are stored in the storage unit 12 as the damage identification rule 123.

Flow of Processing in First Embodiment

Figure 30:
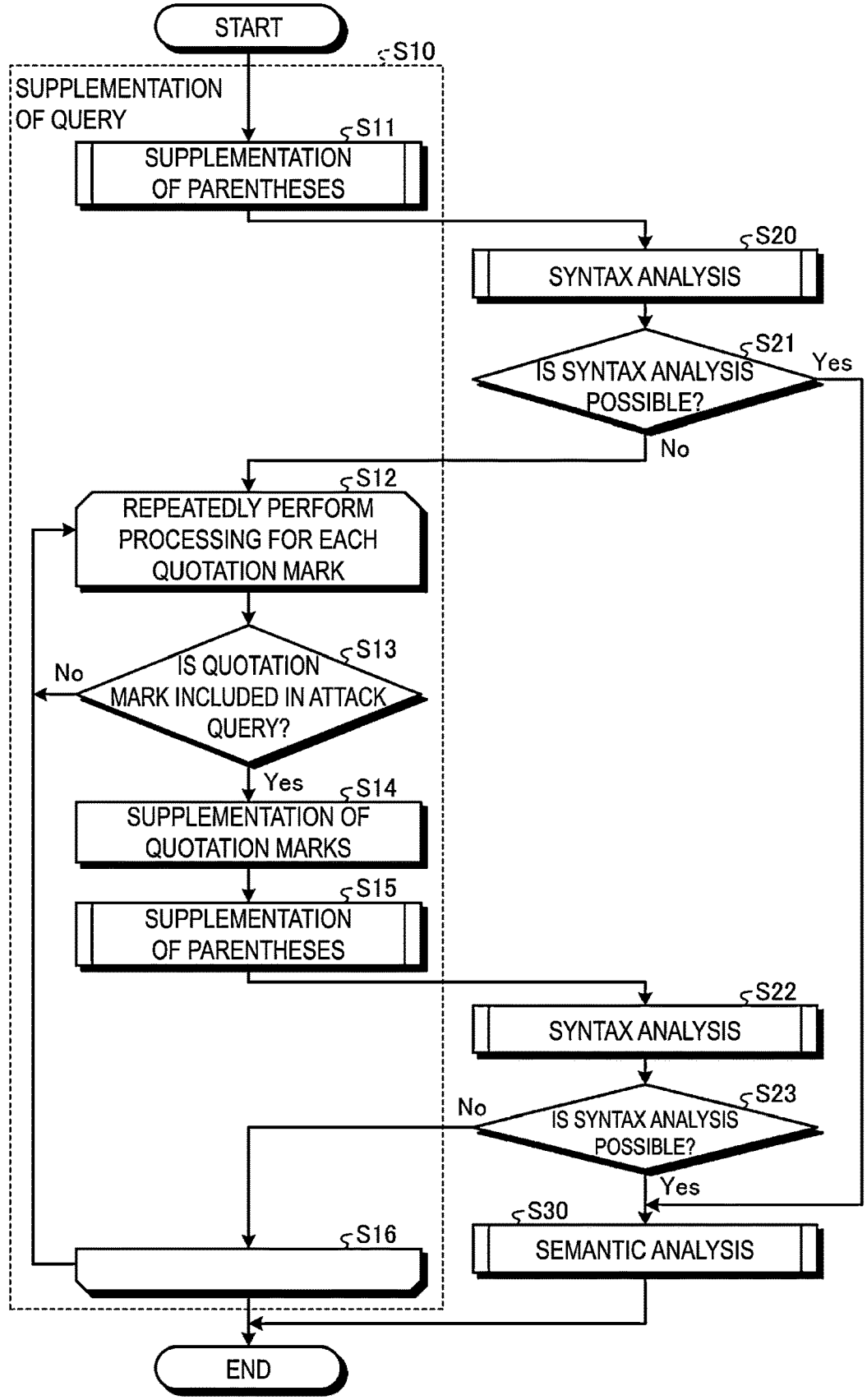
FIG. 30 is a flowchart illustrating a flow of processing of the estimation apparatus according to the first embodiment.

FIG. 30 is a flowchart illustrating a flow of processing of the estimation apparatus according to the first embodiment. As illustrated in FIG. 30, first, the estimation apparatus 10 supplements an acquired attack query (step S10). The estimation apparatus 10 supplements parentheses (step S11). Then, the estimation apparatus 10 performs syntax analysis (step S20). Here, in a case where syntax analysis could be performed (step S21, Yes), the estimation apparatus 10 proceeds to step S30. On the other hand, in a case where syntax analysis could not be performed (step S21, No), the estimation apparatus 10 proceeds to step S12.

The estimation apparatus 10 repeats the processing between step S12 and step S16 for each quotation mark included in an attack query. In a case where no quotation mark is included in an attack query (step S13, No), the estimation apparatus 10 returns to step S12 and repeats the processing. On the other hand, in a case where quotation marks are included in the attack query (step S13, Yes), the estimation apparatus 10 supplements quotation marks (step S14). Further, the estimation apparatus 10 supplements parentheses (step S15).

Further, after the supplementation has been finished, the estimation apparatus 10 performs syntax analysis (step S22). Here, in a case where syntax analysis could be performed (step S23, Yes), the estimation apparatus 10 proceeds to step S30. On the other hand, in a case where syntax analysis could not be performed (step S23, No), the estimation apparatus 10 proceeds to step S16.

Figure 31:
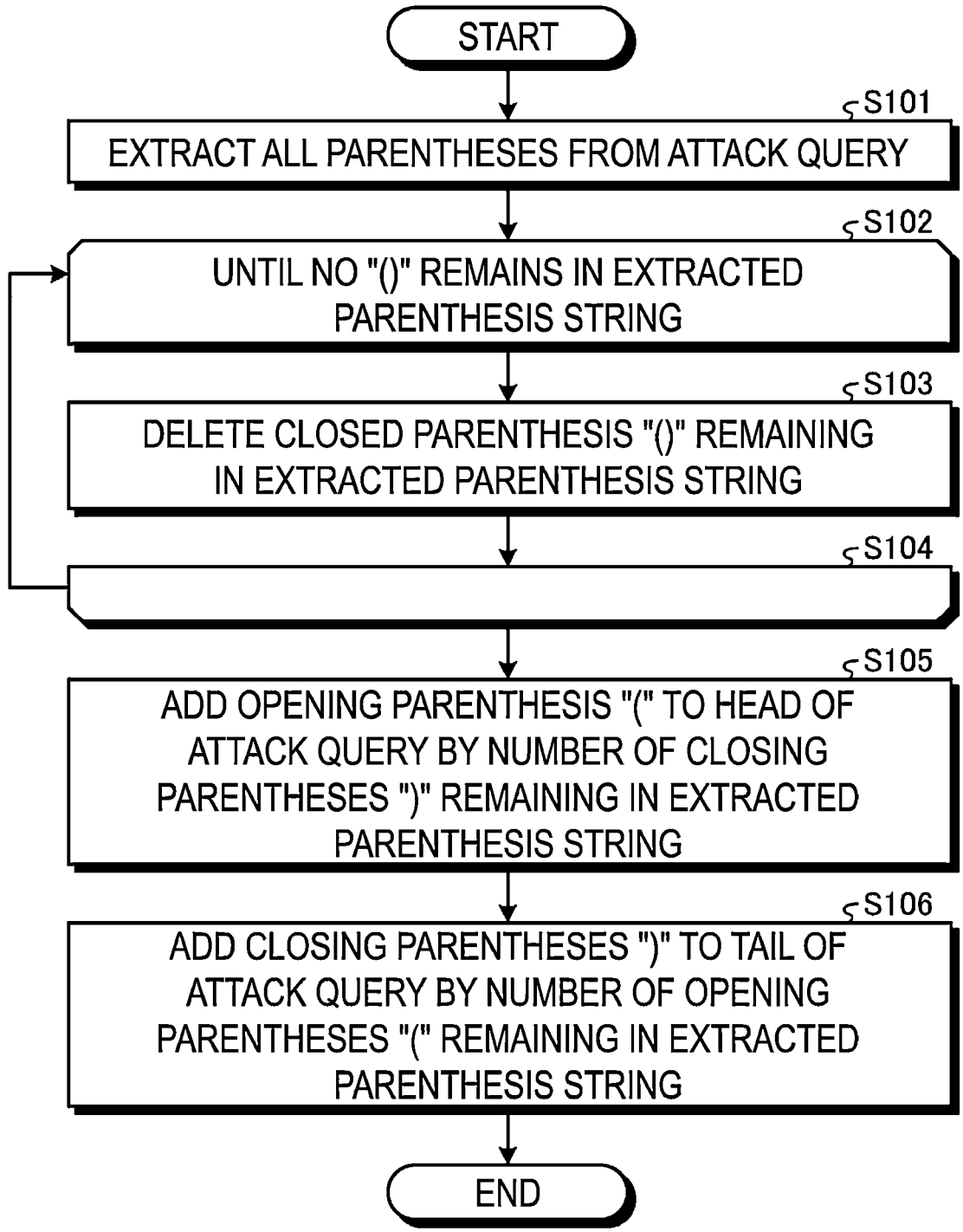
FIG. 31 is a flowchart illustrating a flow of parenthesis supplementation processing.

A flow of parenthesis supplementation processing (steps S11 and S15 in FIG. 30) will be described using FIG. 31. FIG. 31 is a flowchart illustrating a flow of the parenthesis supplementation processing. First, the estimation apparatus 10 extracts all parentheses from an attack query (step S101). Here, the estimation apparatus 10 deletes closing parentheses "( )" until no parentheses "( )" remain in the extracted parenthesis string (steps S102, S103, and S104).

Then, the estimation apparatus 10 adds an opening parenthesis "(" to the head of the attack query by the number of closing parentheses ")" remaining in the extraction parenthesis string (step S105). In addition, the estimation apparatus 10 adds a closing parenthesis ")" to the tail of the attack query by the number of opening parentheses "(" remaining in the extracted parenthesis string (step S106).

Figure 32:
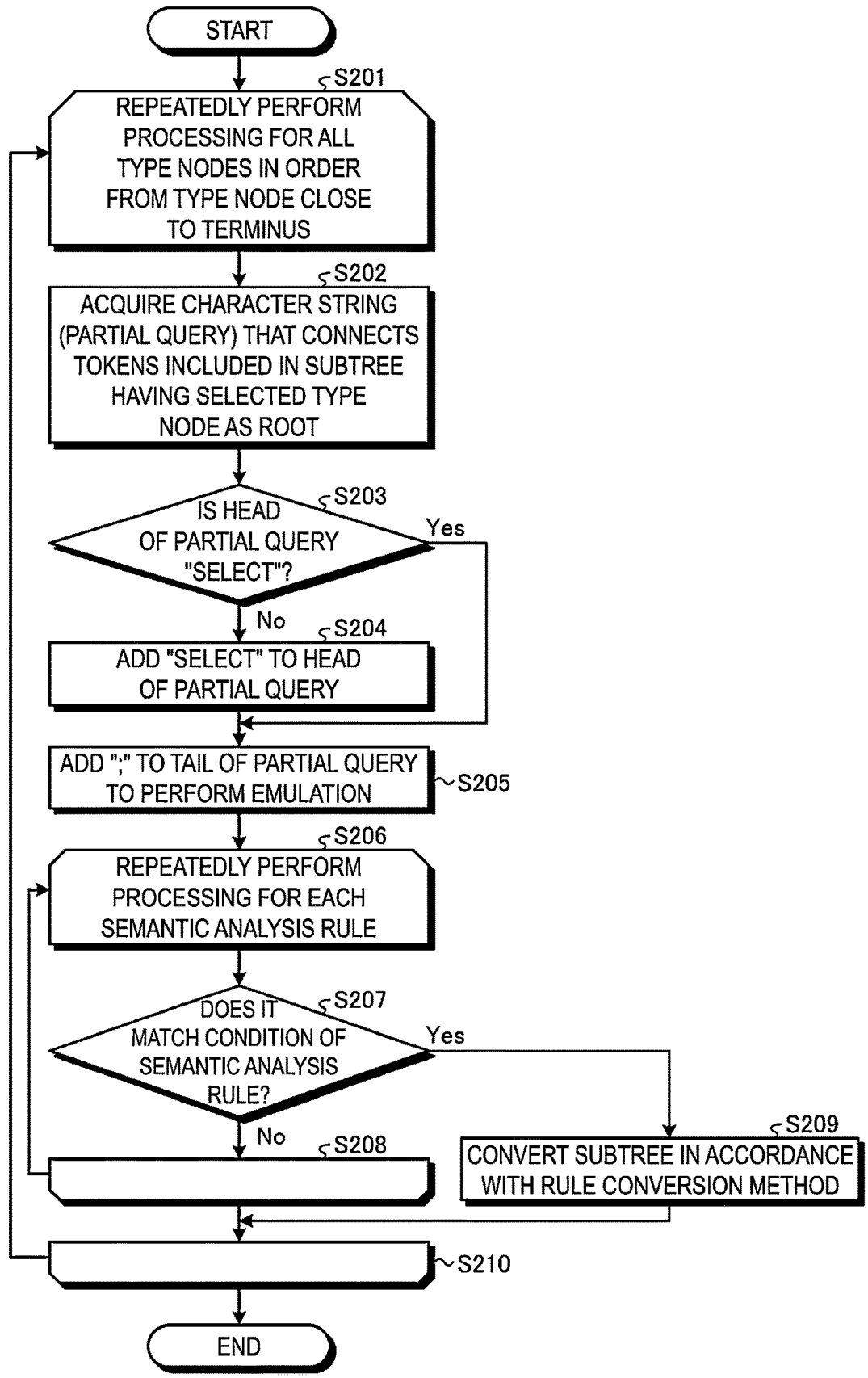
FIG. 32 is a flowchart illustrating a flow of analysis processing.

A flow of analysis processing (steps S20, S22, 30 in FIG. 30) will be described using FIG. 32. FIG. 32 is a flowchart illustrating a flow of the analysis processing. Here, description is given on the assumption that syntax analysis and semantic analysis are continuously performed. The estimation apparatus 10 repeatedly performs processing for all type nodes in order from a type node close to the terminus (steps S201 and S210).

The estimation apparatus 10 acquires a character string (partial query) that connects tokens included in a subtree having a selected type node as a root (step S202). Here, in a case where the head of a partial query is "SELECT" (step S203, Yes), the estimation apparatus 10 proceeds to step S205. On the other hand, in a case where the head of the partial query is not "SELECT" (step S203, No), the estimation apparatus 10 adds "SELECT" to the head of the partial query (step S204). Further, the estimation apparatus 10 adds ";" to the tail of an additional query to execute emulation (step S205).

Here, the estimation apparatus 10 repeats, for each semantic analysis rule, processing for determining whether a condition of the rule is matched(steps S206, S207, and S208). In a case where the condition of the rule is matched (step S207, Yes), the estimation apparatus 10 converts a subtree according to a rule conversion method (step S209).

Figure 33:
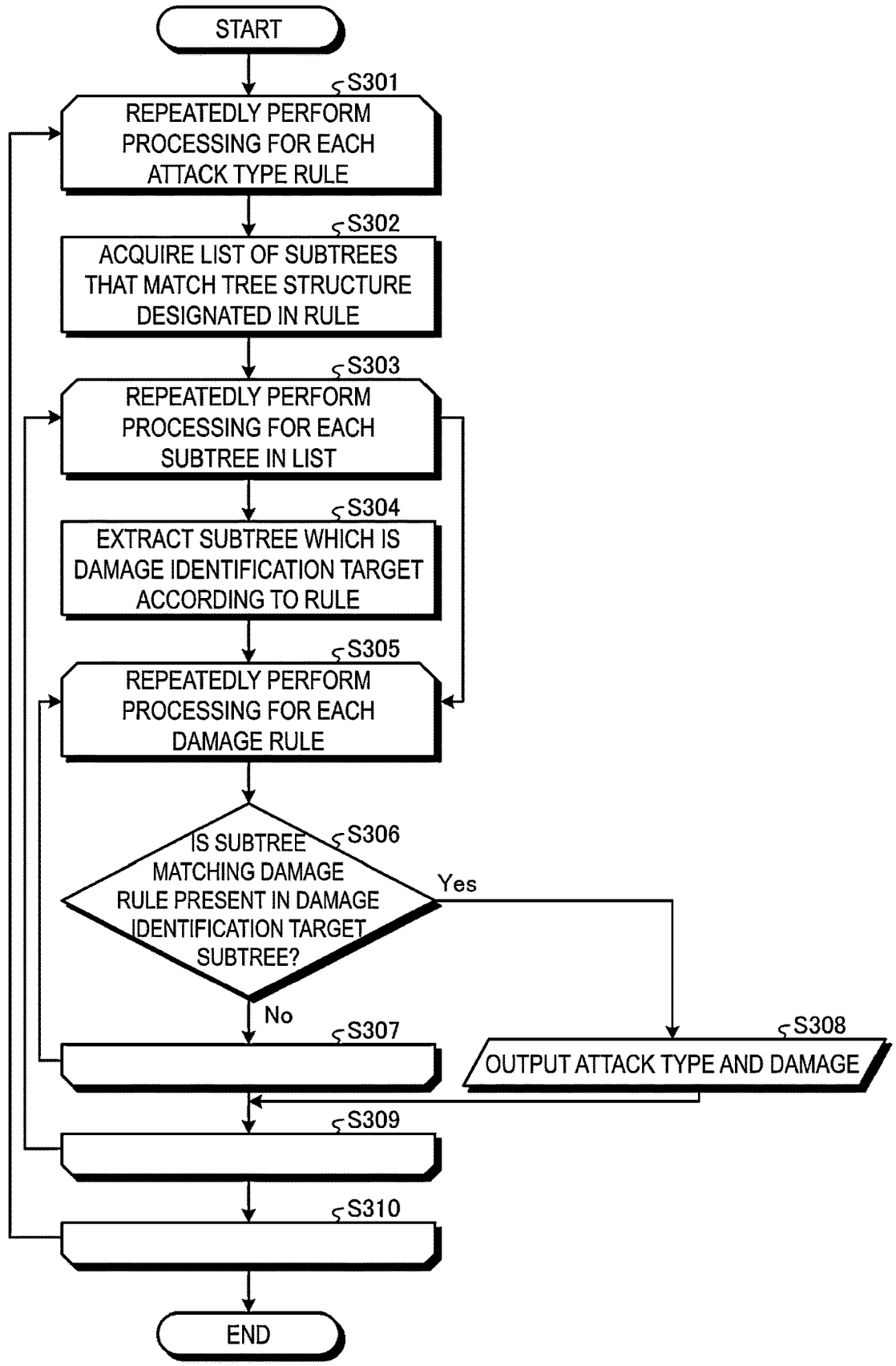
FIG. 33 is a flowchart illustrating a flow of identification processing.

A flow of identification processing will be described using FIG. 33. FIG. 33 is a flowchart illustrating a flow of the identification processing. The identification processing may be performed, for example, after step S16 in FIG. 30. The estimation apparatus 10 repeats, for each attack type rule, the processing between steps S301 and S310.

The estimation apparatus 10 acquires a list of subtrees that match a tree structure designated in the rule (step S302). Here, the estimation apparatus 10 repeats, for each subtree in the list, the processing between step S303 and step S309. The estimation apparatus 10 extracts a subtree which is a damage identification target according to the rule (step S304).

Here, the estimation apparatus 10 repeats, for each damage rule, the processing for determining whether a subtree matching a damage rule is present in a damage identification target subtree(steps S305, S306, and S307). In a case where a condition of the damage rule is matched (step S306, Yes), the estimation apparatus 10 outputs an attack type and a damage (step S308).

Effects of First Embodiment

As described so far, the extraction unit 131 of the estimation apparatus 10 extracts an attack query that has been inserted into a Web request that is detected to be an attack. The creating unit 133 creates a syntax tree from the attack query extracted by the extraction unit 131 in accordance with a rule defined in advance. The impartation unit 134 imparts a label to a subtree which is a part of the syntax tree based on results obtained in a case where an attack query corresponding to the subtree has been executed. The identification unit 135 identifies the type of damage of an attack according to a Web request based on the label imparted by the impartation unit 134. In this manner, the estimation apparatus 10 identifies the type of damage from the attack query of the Web request. As a result, according to the present embodiment, a damage occurring by an SQL injection can be estimated.

Further, the creating unit 133 creates a syntax tree having a first node representing the type of text included in the attack query extracted by the extraction unit 131 and a second node representing a character string included in the text. The impartation unit 134 imparts a label to a subtree having the first node as a root based on results obtained in a case where an attack query corresponding to the subtree has been executed. In this manner, the estimation apparatus 10 generates a tree structure including text and a character string included in the text as nodes. As a result, according to the present embodiment, it is possible to further accurately estimate a damage by clarifying a relationship between character strings included in an attack query.

In addition, the creating unit 133 creates a syntax tree having a character string that is classified as at least any one type of a word, an operator, a character string surrounded by quotation marks, a numerical value, a variable name, and a comment, which are included in a syntax of SQL, as a second node and having a combination of types of second nodes, the combination matching a predefined grammar, as a first node. In this manner, the estimation apparatus 10 creates a syntax tree in which a role in SQL of each character string of an attack query becomes clear. As a result, according to the present embodiment, it is possible to further accurately estimate results of an attack.

In a case where at least a portion of a syntax tree matches a tree structure associated in advance with the type of attack, the identification unit 135 identifies the type of attack as the type of attack according to a Web request and identifies the type of damage of an attack according to a Web request based on a label imparted to a subtree located at a position designated in advance in the tree structure. In this manner, the estimation apparatus 10 identifies an attack type. Thereby, according to the present embodiment, it is possible to further accurately estimate a damage based on an attack query.

The impartation unit 134 imparts any one of a label representing an error, a label representing an environment-dependent function, a label representing access to an environment-dependent system table, and a label representing access to an environment-dependent server specific table to a subtree. In this manner, according to the present embodiment, it is possible to clarify the role of each portion of an attack query.

In a case where a label is not imparted to a subtree, the identification unit 135 identifies the type of damage as investigation of vulnerability. In a case where a label representing an environment-dependent function or a label representing access to an environment-dependent system table is imparted to a subtree, the identification unit 135 identifies the type of damage as leakage of system information. In a case where a label representing access to an environment-dependent server specific table is imparted to a subtree, the identification unit 135 identifies the type of damage as leakage of table contents. In this manner, according to the present embodiment, it is possible to classify a damage according to an attack query in a manner that is easy to understand.

Second Embodiment

An estimation system may further estimate a specific attack target according to an SQL injection and output the estimated results. An estimation system according to a second embodiment can not only identify the type of damage using a syntax tree, but also specify a specific attack target. Examples of the attack target include a DB, a system, and the like. For example, the estimation system may specify a table name included in the DB as an attack target.

Configuration of Second Embodiment

A configuration of the second embodiment will be described. Here, the second embodiment may be realized by replacing the estimation apparatus 10 in the estimation system 1 illustrated in FIG. 1 with an estimation apparatus 10a.

Figure 34:
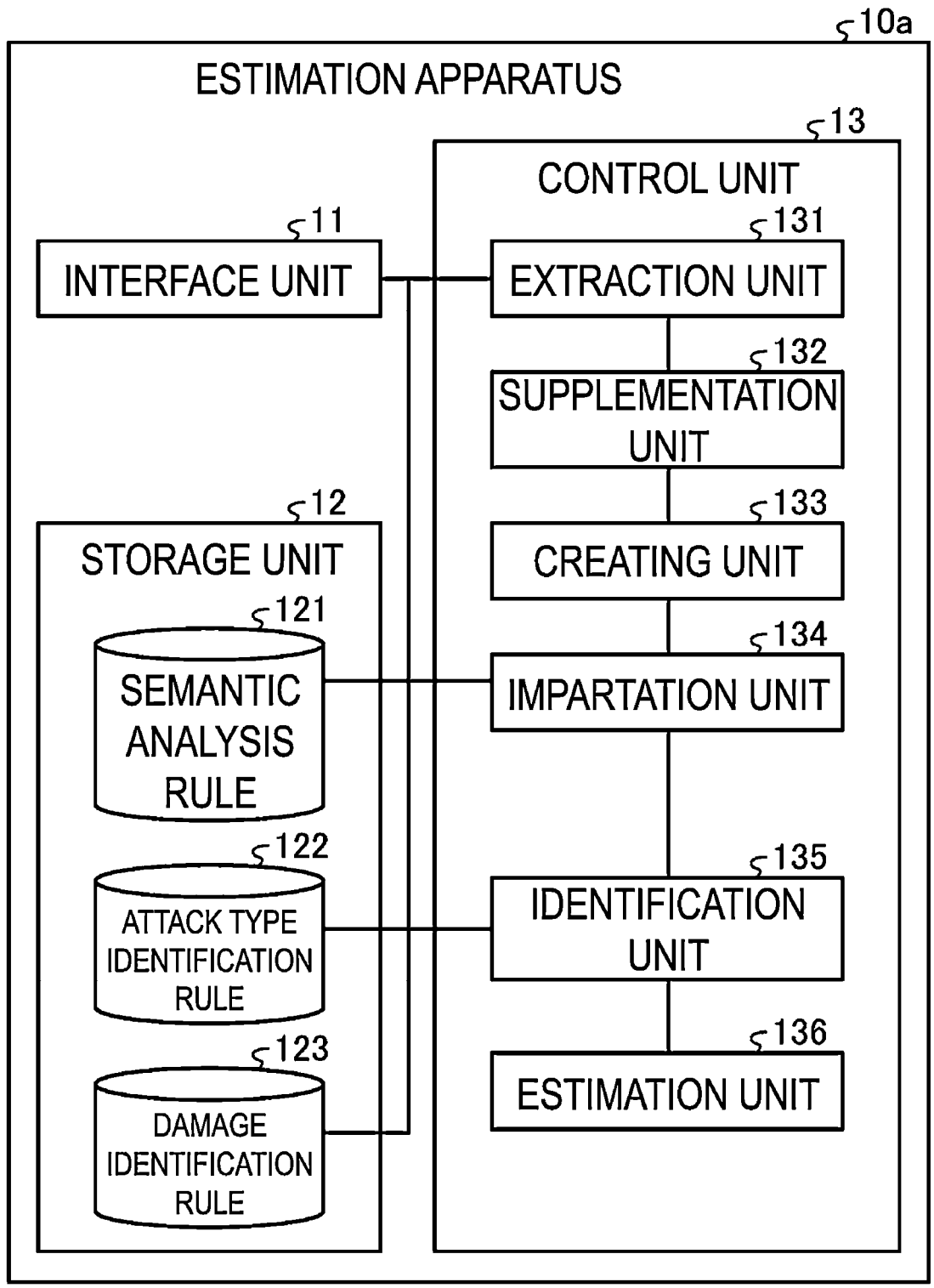
FIG. 34 is a diagram illustrating a configuration example of an estimation apparatus according to a second embodiment.

FIG. 34 is a diagram illustrating a configuration example of the estimation apparatus according to the second embodiment. As illustrated in FIG. 34, the estimation apparatus 10a according to the second embodiment includes an interface unit 11, a storage unit 12, and a control unit 13.

The estimation apparatus 10a includes an estimation unit 136 in addition to the same configuration as that of the estimation apparatus 10 according to the first embodiment.

The estimation unit 136 retrieves information for specifying an attack target and presents the results. Note that the estimation unit 136 is equivalent to a retrieval unit and a presentation unit.

The estimation unit 136 retrieves a subtree that matches a query to be estimated from subtrees included in a syntax tree created from a query inserted into a Web request. Further, the estimation unit 136 presents information for specifying the type of damage of an attack and an attack target, the information being associated in advance with a subtree obtained by retrieval performed by the estimation unit 136. As a result, according to the second embodiment, it is possible to specify an attack target of an SQL injection.

Note that, in the first embodiment, a syntax tree including a subtree is constructed from a query of a Web request. In contrast, in the second embodiment, a subtree included in a syntax tree is retrieved from a query. Thus, the retrieval of a subtree by the estimation unit 136 may be referred to as reverse retrieval.

Figure 35:
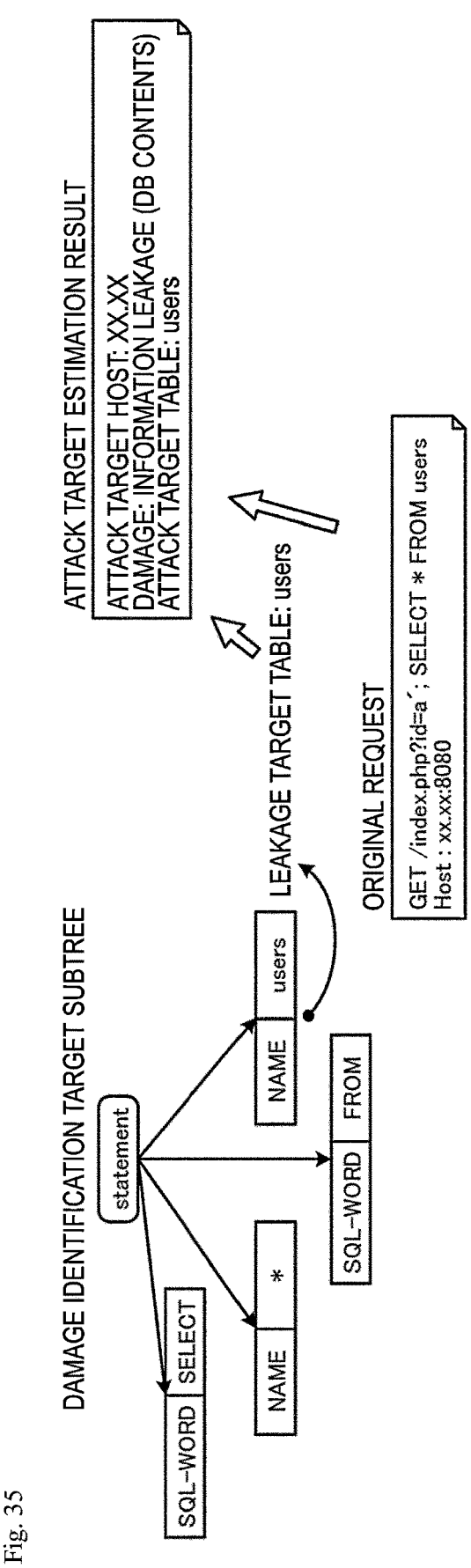
FIG. 35 is a diagram illustrating an attack target estimation method.

FIG. 35 is a diagram illustrating an attack target estimation method. As illustrated in FIG. 35, first, the estimation unit 136 retrieves a subtree that matches a query included in the original request. Then, the estimation unit 136 acquires information for specifying an attack target with reference to a damage target subtree obtained by retrieval and with reference to a node in which a specific table name and the like are described.

For example, the estimation unit 136 may specify a table name or the like of an attack target with reference to <NAME> among the token nodes illustrated in FIG. 13. Further, in a query, it is conceivable that a table name or a system name is surrounded by quotation marks. In this case, the estimation unit 136 can also specify an attack target with reference to <STRING>.

In the example of FIG. 35, the estimation unit 136 obtains a damage identification target subtree that matches "SELECT*FROM users" as a retrieval result. Then, the estimation unit 136 specifies a character string "users" representing a table name described in <NAME>.

The estimation unit 136 generates data associated with an attack target host, a damage, and an attack target table as attack target estimation results. The damage mentioned here is the type of damage identified by the identification unit 135. In addition, the estimation unit 136 may accumulate the generated data in the storage unit 12, or may output the generated data via the interface unit 11.

The estimation apparatus 10a has the same function as that of the estimation apparatus 10 according to the first embodiment. That is, the extraction unit 131 extracts an attack query that has been inserted into a Web request that is detected to be an attack. The creating unit 133 creates a syntax tree in accordance with a rule defined in advance from the attack query extracted by the extraction unit 131. The impartation unit 134 imparts a label to a subtree which is a part of the syntax tree based on results obtained in a case where an attack query corresponding to the subtree has been executed. The identification unit 135 identifies the type of damage of an attack according to a Web request based on the label imparted by the impartation unit 134. The estimation unit 136 retrieves a subtree matching a query to be estimated from subtrees included in the syntax tree created by the creating unit. The estimation unit 136 presents information for specifying the type of damage of an attack and an attack target based on a subtree obtained by retrieval performed by the estimation unit 136 and a label imparted to the subtree. Thus, in the second embodiment, it is possible to consistently perform the generation of a syntax tree and the specification of an attack target.

Flow of Processing in Second Embodiment

Figure 36:
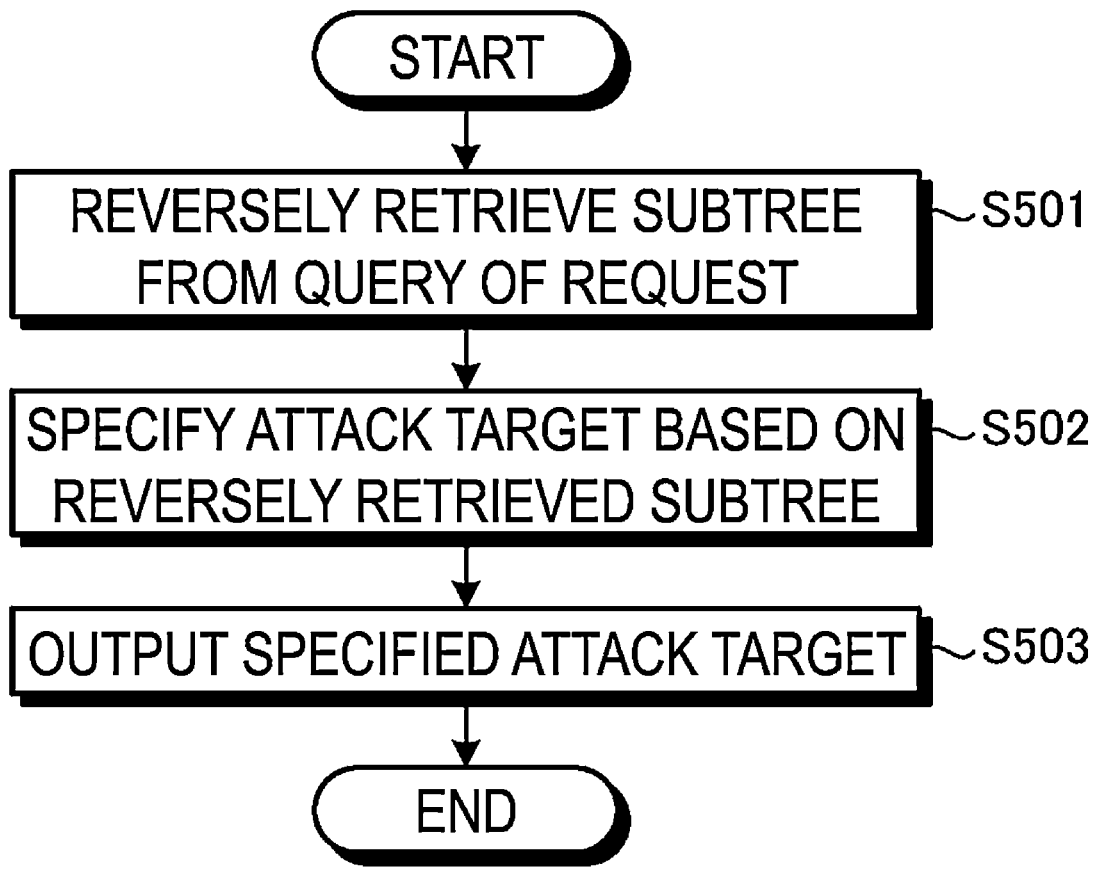
FIG. 36 is a flowchart illustrating a flow of processing of the estimation apparatus according to the second embodiment.

FIG. 36 is a flowchart illustrating a flow of processing of the estimation apparatus according to the second embodiment. As illustrated in FIG. 36, first, the estimation apparatus 10a reversely retrieves a subtree from a query of a request (step S501).

Then, the estimation apparatus 10a specifies an attack target based on the reversely retrieved subtree (step S502). For example, the estimation apparatus 10a may specify a table name or a system name of the attack target with reference to a predetermined node included in the subtree.

Further, the estimation apparatus 10a outputs the specified attack target (step S503). In this case, the estimation apparatus 10a can output the attack target together with the type of damage due to an attack.

System Configuration and the Like

Further, each component of each of the illustrated apparatuses is configured with a functional concept and does not necessarily have to be physically configured as illustrated in the drawing. That is, the specific form of distribution and integration of each apparatus is not limited to the one illustrated in the drawing and all or part of them can be functionally or physically distributed or integrated in arbitrary units according to various loads, usage conditions, and the like. Further, all or any portion of each processing function performed by each apparatus may be realized by a CPU and a program analyzed and executed by the CPU or may be realized as hardware by wired logic.

In addition, all or some of the processes described as being performed automatically among the processes described in this embodiment can be performed manually, or all or some of the processes described as being performed manually can be performed automatically by a known method. In addition, information including the processing procedures, control procedures, specific names, and various types of data or parameters illustrated in the above document or drawings can be arbitrarily changed unless otherwise specified.

Program

In one embodiment, the estimation apparatus 10a can be implemented by installing an estimation program that executes the aforementioned estimation processing as package software or online software on a desired computer. For example, it is possible to cause an information processing apparatus to function as the estimation apparatus 10a by causing the information processing apparatus to execute the aforementioned estimation program. Here, the information processing apparatus includes a desktop or laptop personal computer. In addition, examples of the information processing apparatus include a smartphone, a mobile communication terminal such as a mobile phone or a personal handy-phone system (PHS), and a slate terminal such as a personal digital assistant (PDA).

Further, the estimation apparatus 10a can also be implemented as an estimation server apparatus that provides to services regarding the above-described estimation processing to a client by using a terminal apparatus to be used by a user as the client. For example, the estimation server apparatus is implemented as a server apparatus that provides an estimation service that uses a Web request as an input and uses information for specifying an identification result of a damage due to an attack and an attack target as outputs. In this case, the estimation server apparatus may be implemented as a web server or may be implemented as a cloud that provides services regarding the above-described estimation processing through outsourcing.

Figure 37:
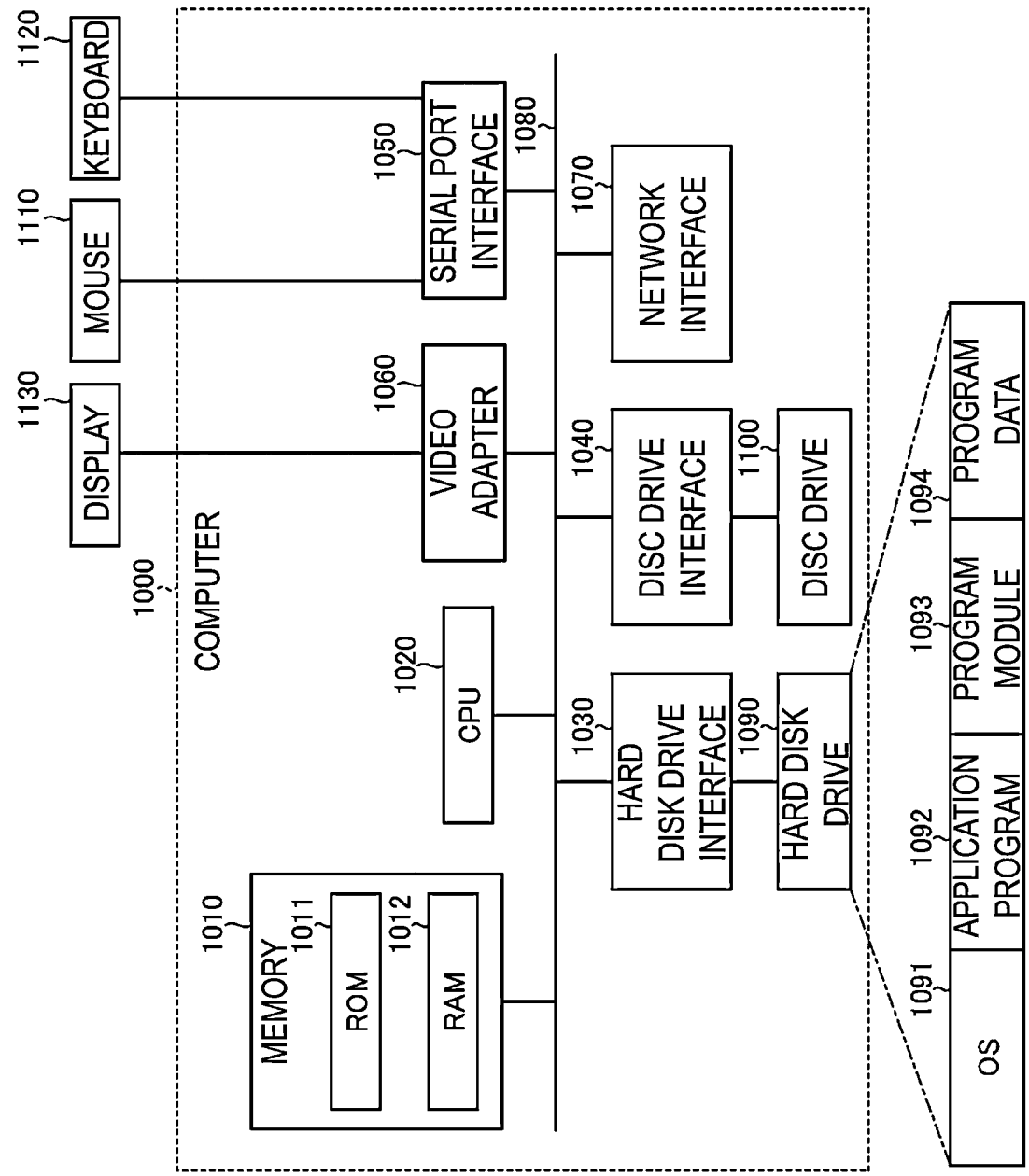
FIG. 37 is a diagram illustrating an example of a computer that executes an estimation program.

FIG. 37 is a diagram illustrating an example of a computer that executes an estimation program. A computer 1000 includes, for example, a memory 1010 and a CPU 1020. Further, the computer 1000 includes a hard disk drive interface 1030, a disc drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores a boot program such as, for example, a basic input output system (BIOS). The hard disk drive interface 1030 is connected to a hard disk drive 1090. The disc drive interface 1040 is connected to a disc drive 1100. A removable storage medium such as, for example, a magnetic disc or an optical disc is inserted into the disc drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. That is, a program defining each processing of the estimation apparatus 10a is implemented as the program module 1093 in which a computer executable code is described. The program module 1093 is stored in, for example, the hard disk drive 1090. For example, the program module 1093 for executing similar processing as for the functional configurations of the estimation apparatus 10a is stored in the hard disk drive 1090. The hard disk drive 1090 may be replaced with an SSD.

Further, setting data used in the process of the embodiment described above is stored as the program data 1094 in the memory 1010 or the hard disk drive 1090, for example. The CPU 1020 reads the program module 1093 and the program data 1094 stored in the memory 1010 and the hard disk drive 1090 into the RAM 1012 as necessary, and executes the processing of the above-described embodiments.

The program module 1093 and the program data 1094 are not necessarily stored in the hard disk drive 1090, and may be stored in, for example, a removable storage medium and be read out by the CPU 1020 through the disc drive 1100 or the like. Alternatively, the program module 1093 and the program data 1094 may be stored in another computer connected via a network (a local area network (LAN), a wide area network (WAN), or the like). The program module 1093 and the program data 1094 may be read from another computer via the network interface 1070 by the CPU 1020.

REFERENCE SIGNS LIST

- 1 Estimation system
- 2 Internet
- 3 Server
- 4 Detection apparatus
- 10 Estimation apparatus
- 11 Interface unit
- 12 Storage unit
- 13 Control unit
- 121 Semantic analysis rule
- 122 Attack type identification rule
- 123 Damage identification rule
- 131 Extraction unit
- 132 Supplementation unit
- 133 Creating unit
- 134 Impartation unit
- 135 Identification unit
- 136 Estimation unit

The invention claimed is:

1. An estimation system comprising:
   retrieval circuitry configured to retrieve a subtree that matches a query to be estimated, from subtrees included in a syntax tree created from the query which is inserted into a Web request;
   presentation circuitry configured to present information for specifying a type of damage of an attack and an attack target, the information being associated in advance with the subtree obtained by the retrieval circuitry in the retrieval;
   extraction circuitry configured to extract the query inserted into the Web request that is detected to be the attack;
   creating circuitry configured to create the syntax tree from the query extracted by the extraction circuitry in accordance with a rule defined in advance;
   impartation circuitry configured to impart a label to the subtree that is a part of the syntax tree based on a result obtained in a case where the query corresponding to the subtree has been executed; and
   identification circuitry configured to identify the type of damage of the attack according to the Web request based on the label imparted by the impartation circuitry,
   wherein:
   the retrieval circuitry retrieves the subtree that matches the query to be estimated, from subtrees included in the syntax tree created by the creating circuitry, and
   the presentation circuitry presents information for specifying the type of damage of the attack and the attack target, based on the subtree obtained by the retrieval circuitry in the retrieval and the label imparted to the subtree.

2. The estimation system according to claim 1, wherein:
   the presentation circuitry presents a table name as information for specifying the attack target.

3. An estimation method at an estimation system, the estimation method comprising:
   retrieving a subtree that matches a query to be estimated, from subtrees included in a syntax tree created from the query which is inserted into a Web request;
   presenting information for specifying a type of damage of an attack and an attack target, the information being associated in advance with the subtree obtained in the retrieving;
   extracting the query inserted into the Web request that is detected to be the attack;
   creating the syntax tree from the query extracted by the extracting in accordance with a rule defined in advance;
   imparting a label to the subtree that is a part of the syntax tree based on a result obtained in a case where the query corresponding to the subtree has been executed; and
   identifying the type of damage of the attack according to the Web request based on the label imparted by the imparting,
   wherein:
   the retrieving retrieves the subtree that matches the query to be estimated, from subtrees included in the syntax tree created by the creating, and the presenting presents information for specifying the type of damage of the attack and the attack target, based on the subtree obtained by the retrieving in the retrieval and the label imparted to the subtree.

4. A non-transitory computer readable medium including an estimation program which when executed causes a computer to:
   retrieve a subtree that matches a query to be estimated, from subtrees included in a syntax tree created from the query which is inserted into a Web request;
   present information for specifying a type of damage of an attack and an attack target, the information being associated in advance with the subtree obtained in the retrieving;
   extract the query inserted into the Web request that is detected to be the attack;
   create the syntax tree from the query extracted by the extracting in accordance with a rule defined in advance;
   impart a label to the subtree that is a part of the syntax tree based on a result obtained in a case where the query corresponding to the subtree has been executed; and
   identify the type of damage of the attack according to the Web request based on the label imparted by the imparting,
   wherein:
   the retrieving retrieves the subtree that matches the query to be estimated, from subtrees included in the syntax tree created by the creating, and
   the presenting presents information for specifying the type of damage of the attack and the attack target, based on the subtree obtained by the retrieving in the retrieval and the label imparted to the subtree.

5. The estimation method according to claim 3, wherein:
   the presenting presents a table name as information for specifying the attack target.

6. The non-transitory computer readable medium estimation system according to claim 4, wherein:
   the presenting presents a table name as information for specifying the attack target.

\* \* \* \* \*